US008457455B2

(12) United States Patent
Terakawa et al.

(10) Patent No.: US 8,457,455 B2
(45) Date of Patent: Jun. 4, 2013

(54) OPTICAL WAVEGUIDE, OPTICAL WAVEGUIDE MODULE, AND ELECTRONIC APPARATUS

(75) Inventors: Yukari Terakawa, Kyoto (JP); Hayami Hosokawa, Kyoto (JP)

(73) Assignee: OMRON Corporation, Kyoto (JP)

( * ) Notice: Subject to any disclaimer, the term of this patent is extended or adjusted under 35 U.S.C. 154(b) by 603 days.

(21) Appl. No.: 12/530,793

(22) PCT Filed: Mar. 14, 2008

(86) PCT No.: PCT/JP2008/054721
§ 371 (c)(1),
(2), (4) Date: Sep. 11, 2009

(87) PCT Pub. No.: WO2008/114717
PCT Pub. Date: Sep. 25, 2008

(65) Prior Publication Data
US 2010/0135613 A1 Jun. 3, 2010

(30) Foreign Application Priority Data
Mar. 16, 2007 (JP) .................................. 2007-069622

(51) Int. Cl.
*G02B 6/42* (2006.01)
*G02B 6/02* (2006.01)

(52) U.S. Cl.
USPC ............................................. 385/27; 385/123

(58) Field of Classification Search
USPC ................... 385/27, 88, 129–132, 146
See application file for complete search history.

(56) References Cited

U.S. PATENT DOCUMENTS

| 6,334,014 B1 * | 12/2001 | Nitta et al. ..................... 385/39 |
| 2007/0140615 A1 | 6/2007 | Tanaka et al. |
| 2009/0257713 A1 | 10/2009 | Itagaki |

FOREIGN PATENT DOCUMENTS

| JP | 4-346301 A | 12/1992 |
| JP | 2000-137138 A | 5/2000 |
| JP | 2000-214351 A | 8/2000 |
| JP | 2000-292656 A | 10/2000 |
| JP | 2003-307603 A | 10/2003 |
| JP | 2005-331535 A | 12/2005 |
| WO | 2007/026843 A1 | 3/2007 |

OTHER PUBLICATIONS

International Search Report w/translation from PCT/JP2008/054721 dated Apr. 8, 2008 (4 pages).
espacenet.com Abstract; Publication No. JP4346301 dated Dec. 2, 1992; Nippon Telegraph & Telephone Corp. (1 page).

(Continued)

*Primary Examiner* — Kevin S Wood
(74) *Attorney, Agent, or Firm* — Osha Liang LLP

(57) ABSTRACT

A light guide includes a core and a clad made of a material having an index of refraction different from an index of refraction of the core and covering the core, in which at least one of a light incident surface or a light exit surface of the core is arranged while shifted in parallel without changing respective inclined angles so that the inclined surface is divided into a plurality of inclined surfaces parallel in a longitudinal direction (X direction) of the rectangular shape in the orthogonal projection and the plurality of inclined surfaces closer to the light emitting portion are positioned in a direction (Z direction) of moving away from the end face to be in a shape extending in the direction (Z direction) of moving away from the end face in a stepwise manner as a whole.

13 Claims, 20 Drawing Sheets

OTHER PUBLICATIONS espacenet.com Abstract; Publication No. 2000137138 dated May 16, 2000; Canon Inc. (1 page).
espacenet.com Abstract; Publication No. JP2003307603 dated Oct. 31, 2003; Omron Corp. (1 page).
espacenet.com Abstract; Publication No. WO2007026843 dated Mar. 8, 2007; Mitsumi Electric Co., Ltd. (1 page).
espacenet.com Abstract; Publication No. JP2000214351 dated Aug. 4, 2000; Nippon Telegraph and Telephone Corp. (1 page).
espacenet.com Abstract; Publication No. JP2000292656 dated Oct. 20, 2000; Sony Corp. (1 page).
espacenet.com Abstract; Publication No. JP2005331535 dated Dec. 2, 2005; Sony Corp. (1 page).
Machine English translation of Japanese Publication No. 2000-137138 published on May 16, 2000, 42 pages.
Korean Office Action issued in Korean Application No. 10-2009-7019216 mailed on Mar. 14, 2011, and English translation thereof, 8 pages.
Extended European Search Report for Application No. 08722117.2, mailed on May 7, 2012 (7 pages).

* cited by examiner

OPTICAL WAVEGUIDE, OPTICAL WAVEGUIDE MODULE, AND ELECTRONIC APPARATUS

TECHNICAL FIELD

The present invention relates to a light guide for transmitting an optical signal, a light guide module, and an electronic device.

BACKGROUND ART

In recent years, an optical communication network enabling large capacity data communication at high speed is expanding. The optical communication network is assumed to be mounted from intra-devices to inter-device in the future. A light guide that can be arrayed is expected to realize the print wiring substrate as an optical wiring.

The light guide has a double structure of a center core, which is called a core, and a capsule, which is called a clad, that covers the core, where the index of refraction of the core is higher than the clad. In other words, the optical signal entered to the core is propagated by repeating total reflection inside the core.

In recent years, in particular, realization of a flexible optical wiring mounted on a smaller and thinner commercially-off-the-shelf device with the light guide is desired. A light guide having high bendability is being developed by using a material more flexible than the related art for the material of the core and the clad of the light guide. The data transmission between the substrates in the device can be carried out with the light guide by using the light guide having high bendability.

A mechanism of light transmission in the light guide module using the light guide will be briefly described. First, a drive portion drives the light emission of the light emitting portion (optical element) based on an externally input electrical signal, and the light emitting portion irradiates the light incident surface of the light guide with light. The light applied to the light incident surface of the light guide is introduced into the light guide (core), propagated by repeating total reflection inside the core, and exit from the light exit surface of the light guide. The light exit from the light exit surface of the light guide is received by a light receiving portion (optical element) and converted to an electrical signal.

The light guide module using such light guide is disclosed in Patent Document 1 to 3, and the like. The conventional light guide modules use an area light emitting laser for the laser emitting portion, and the light incident surface and the light exit surface of the light guide are arranged while inclined with respect to the light transmission direction in a case where the light is transmitted in the core to miniaturize the light guide module. The light from the light emitting portion is applied in the lateral direction with respect to the light transmission direction in the light guide, and the light reflected at the light incident surface is introduced into the core. The light propagated through the core is reflected at the light exit surface and exit in the lateral direction with respect to the light transmission direction.

Patent Document 1: Japanese Laid-Open Patent Publication No. 2000-214351 (date of publication: Aug. 4, 2000)
Patent Document 2: Japanese Laid-Open Patent Publication No. 2000-292656 (date of publication: Oct. 20, 2000)
Patent Document 3: Japanese Laid-Open Patent Publication No. 2005-331535 (date of publication: Dec. 2, 2005)

DISCLOSURE OF THE INVENTION

In such light guide modules, the region of the light introduced into the light guide of the light emitting regions of the light emitted from the light emitting portion is determined by the inclined angle of the light incident surface of the light guide and the index of refraction of the light guide. FIG. 19 is a cross-sectional view showing a light emitting region of the light emitted from the light emitting portion to be introduced into the light guide (core). $\theta1$ and $\theta2$ are angles showing the range the light emitted from the light emitting portion can be introduced into the core, and respectively shows the angle with respect to a light emission axis in the normal line direction at the light emitting portion. In other words, the light emitted in the range of $\theta1$ and $\theta2$ is totally reflected at the light incident surface and introduced into the core. Specifically, for example, the light guide is made of general resin material, where the respective angle is about $\theta1=6$ degrees and $\theta2=17$ degrees when the NA (Numerical Aperture) is 0.45.

In the conventional light guide module, the positional relationship of the light incident surface of the light guide and the range ($\theta1$ and $\theta2$) of the light from the light emitting portion that can be introduced into the light guide fluctuates due to variation when mounting the light emitting portion, variation when mounting the light guide and the like, and a range where the light is not applied to the light incident surface of the light guide of the range ($\theta1$ and $\theta2$) of the light from the light emitting portion that can be introduced into the light guide forms. Thus, the light quantity of the light to be introduced into the light guide is reduced. In other words, the coupling loss, which is the loss of light that occurs when the light from the light emitting portion enters the light guide, increases. If the light quantity of the light introduced into the light guide reduces due to the coupling loss, the light quantity of the light received by the light receiving portion is also reduced, and thus stable light transmission becomes difficult.

FIGS. 20($a$) and 20($b$) are cross-sectional views in a case where positional shift occurs when mounting the light emitting portion and the light guide. As shown in FIG. 20($a$), the light in the range of $\theta1$ is not applied to the light incident surface of the core and becomes a loss, and the light in the range of $\theta4$-$\theta2$ is totally reflected at the light incident surface but exceeds the index of refraction of the light guide, thus the light cannot be propagated through the light guide and becomes a loss. As shown in FIG. 20($b$), the light in the range of $\theta6$-$\theta2$ is not applied to the light incident surface of the core and becomes a loss, and the light in the range of $\theta5$-$\theta1$ is transmitted without being totally reflected as the incident angle with respect to the light incident surface exceeds a critical angle and becomes a loss.

Thus, in the conventional light guide module, the coupling loss increases and fluctuates due to variation and the like in mounting, and a stable light transmission becomes difficult. Furthermore, if the light emitting amount from the light emitting portion is increased to correct the reduction in the light receiving amount at the light receiving portion that occurs by the coupling loss, the power consumption increases. Moreover, a feedback circuit is required to perform a stable light transmission, whereby the development period extends, the IC cost increases, and the system power consumption increases.

A method of absorbing variation in mounting the light guide and the light emitting portion by reducing the distance between the light guide and the light emitting portion is considered as a method of reducing the coupling loss. FIG. 21 is a cross-sectional view of a light guide module in a case where the light emitting portion and the light guide are mounted in a package. However, the distance is difficult to be reduced since the distance between the light guide and the light emitting portion needs to be secured as a wiring space for mounting the light emitting portion.

A method of absorbing variation in mounting the light guide and the light emitting portion by increasing the height (thickness) of the core that becomes the normal line direction of the light emitting portion is considered as another method of reducing the coupling loss. However, if the thickness of the core is made large, the thickness of the entire light guide module becomes large, and the loss of light due to bending of the light guide (bending loss) increases. If the bending loss increases even though the coupling loss is reduced, the loss of light cannot be reduced in the light guide module as a whole, and thus stable light transmission cannot be carried out.

Thus, in the conventional light guide module, it is difficult to reduce the coupling loss in the light emitting portion and the light guide while performing a stable light transmission.

Similar to the problems on the light emitting portion side, the problem in that the light quantity received by the light receiving portion fluctuates due to variation and the like when mounting the light guide and the light receiving portion arises on the light receiving portion side, which adversely affects the stable light transmission. Thus, the fluctuation of the light quantity needs to be suppressed and maintained constant not only on the light emitting portion side but also on the light receiving portion side in order to realize a stable light transmission in the light guide module.

To this end, the relationship of the light receiving region in the light receiving portion and the irradiation region of the light applied from the light guide to the light receiving portion is preferably the relationship shown in FIG. 22(a) so as not to be susceptible to the influence of fluctuation of the light receiving quantity due to variation and the like when mounting the light guide and the light receiving portion. In other words, the light receiving region of the light receiving portion is preferably sufficiently larger than the irradiation region applied from the light guide to the light receiving portion. However, the light reception size of the light receiving portion itself needs to be made large to increase the light receiving region, which increases the manufacturing cost. As the light receiving region becomes larger, higher speed of the response speed becomes difficult to respond.

A method of reducing the irradiation region with respect to the light receiving region without increasing the light receiving region of the light receiving portion and reducing the distance between the light receiving portion and the light guide so as to obtain the relationship shown in FIG. 22(b) is considered. However, in such method, the wire mounted on the light receiving portion becomes an impediment, and thus the distance between the light receiving portion and the light guide cannot be reduced to the desired distance and sufficient effects cannot be obtained.

The relationship between the light receiving region and the irradiation region in the conventional light guide module is illustrated below. FIG. 22(b) is a view showing the relationship of the light receiving region and the irradiation region in the conventional light guide module where the light receiving region of the light receiving portion and the irradiation region of the light applied from the light guide to the light receiving portion are substantially the same size. In the conventional configuration shown in the figure, the light receiving quantity at the light receiving portion fluctuates due to variation when mounting the light receiving portion and the light guide, as described above. To correct the fluctuation of the light receiving amount and stably operate the light guide module, a feedback circuit and the like are required, and various problems accompanied therewith such as extension of the development period, increase in the IC cost, and increase in the system power consumption arise.

FIG. 22(c) is a view showing a relationship of the light receiving region and the irradiation region in the conventional light guide module where the irradiation region of the light applied from the light guide to the light receiving portion is sufficiently larger than the light receiving region of the light receiving portion. According to such configuration, the light receiving quantity at the light receiving portion can be maintained constant as the light receiving region does not deviate from the irradiation region even if variation occurs when mounting the light receiving portion and the light guide. However, the distance from the light guide to the light receiving portion needs to be made large to extend the irradiation region, in which case, the size of the entire light guide module enlarges and mounting to a small electronic device becomes difficult. A method of increasing the height (thickness) of the core that becomes the normal line direction of the light receiving portion to extend the irradiation region is also considered, but in such case, the bending loss becomes large when using the light guide in a bent state and stable light transmission cannot be performed, as shown in FIG. 23.

Thus, in the conventional light guide module, it is difficult to suppress the fluctuation of the light receiving amount due to variation when mounting the light receiving portion and the light guide while performing stable light transmission.

The fluctuation of the light receiving amount due to variation when mounting the light receiving portion and the light guide is particularly significant in the direction parallel to the light transmission direction in a case where the light is transmitted in the light guide. FIGS. 24(a) and 24(b) are views showing a relationship of the light receiving region of the light receiving portion and the irradiation region of the light applied from the light guide in the conventional light guide module. Generally, in the light guide in the light guide module, increasing the width direction that becomes the longitudinal direction of the core at the cross-section orthogonal to the light transmission direction does not raise any problem in terms of space. Thus, as shown in FIG. 24(b), the width of the core can be made large such that the irradiation region becomes sufficiently larger than the light receiving region. Thus, in the width direction of the core, the light quantity received by the light receiving portion can be maintained constant since the proportion of the irradiation region with respect to the light receiving region does not change even if variation occurs when mounting the light receiving portion and the light guide. Thus, measures need to be taken on the variation in the direction (direction of arrow in the figure) parallel to the light transmission direction to suppress the fluctuation of the light receiving quantity in the light receiving portion.

The present invention has been devised to solve the problems described above, and an object thereof is to provide a light guide, a light guide module, and an electronic device capable of suppressing the fluctuation amount of the light loss in light transmission and enabling stable light transmission with a simple configuration.

In order to solve the above problems, the present invention provides a light guide including a core made of a material having translucency and a clad made of a material having an index of refraction different from an index of refraction of the core and surrounding a periphery of the core, a light incident surface and a light exit surface, which are end faces of the core and the clad, being formed as inclined surfaces so that an orthogonal projection to a plane orthogonal to an extending direction of the light guide has a rectangular shape and being inclined at a predetermined angle in a direction of moving away from the end face, a light applied from a light source being introduced into the core by being reflected at the light incident surface and a light transmitted through the core being exit to outside by being reflected at the light exit surface; wherein at least one of the light incident surface or the light exit surface of the core is arranged while shifted in parallel without changing respective inclined angles so that the inclined surface is divided into a plurality of inclined surfaces parallel in a longitudinal direction of the rectangular shape in the orthogonal projection and the plurality of inclined surfaces closer to the light source are positioned in a direction of moving away from the end face to be in a shape extending in the direction of moving away from the end face in a stepwise manner as a whole.

In the conventional configuration, when variation in mounting the light emitting portion and variation in mounting the light guide occur, the positional relationship of the light incident surface of the light guide and the range of light from the light emitting portion that can be introduced into the light guide fluctuates, whereby a range that is not applied to the light incident surface of the light guide of the range of the light from the light emitting portion that can be introduced into the light guide is generated. Thus, the coupling loss, i.e., loss of light that occurs when the light from the light emitting portion enters the light guide fluctuates. On the light receiving side as well, some of the light exit from the light guide is applied to the outside of the range of the light receiving region of the light receiving portion due to variation in mounting the light receiving portion and variation in mounting the light guide, whereby the light quantity received by the light receiving portion fluctuates. In other words, the coupling loss, i.e., loss of light that occurs when the light exit from the light guide is received by the light receiving portion fluctuates.

According to the configuration of the present invention, on the other hand, at least one of the light incident surface or the light exit surface of the core is formed in a stepwise manner in the extending direction so as to include a plurality of inclined surfaces. In other words, the end face of the core is arranged while shifted in parallel without changing the respective inclined angle such that the inclined surface is divided into a plurality of inclined surfaces parallel in a longitudinal direction of a rectangular shape in the orthogonal projection and the plurality of inclined surfaces closer to the light source are positioned in a direction of moving away from the end face, whereby the end face of the core is made to a shape extending in the direction of moving away from the end face in a stepwise manner as a whole.

Therefore, if the light incident surface of the core is formed in a stepwise manner in the extending direction (direction of moving away from the end face of the light guide) so as to include a plurality of inclined surfaces, the light incident surface of the core can be made larger than the range of the light from the light emitting portion that can be introduced into the light guide. Thus, when variation in time of mounting occurs, the light that is outside the irradiation region in the conventional light incident surface can be reliably reflected at the light incident surface and introduced into the light guide. Therefore, the light quantity introduced into the light guide can be maintained constant irrespective of the fluctuation of the positional relationship of the light incident surface of the light guide and the range of the light from the light emitting portion that can be introduced into the light guide, whereby the fluctuation amount of the coupling loss, i.e., loss of light that occurs when the light from the light emitting portion enters the light guide can be suppressed. Therefore, according to the light guide, a more stable light transmission can be performed compared to the conventional configuration.

Furthermore, if the light exit surface of the core is formed in a stepwise manner in the extending direction so as to include a plurality of inclined surfaces, the irradiation region to the light receiving portion of the light exit from the light guide can be enlarged compared to the conventional configuration. Thus, when variation in time of mounting occurs, the light exit from the light guide can be applied even to the light receiving region where light is not applied in the conventional configuration. Therefore, the light quantity received by the light receiving portion can be maintained constant even if variation in time of mounting and the like occurs, whereby the fluctuation amount of the coupling loss, i.e., loss of light that occurs when the light exit from the light guide is received by the light receiving portion can be suppressed. Therefore, according to the light guide, a more stable light transmission can be performed compared to the conventional configuration.

Therefore, according to the light guide of the present invention, the fluctuation amount of the loss of light in light transmission can be suppressed and a stable light transmission can be realized with a simple configuration of forming the light incident (exit) surface in a stepwise manner in the extending direction of the light guide so as to include a plurality of inclined surfaces without the complex configuration such as adding a feedback circuit and the like to compensate for the loss of light as in the related art. Moreover, enlargement of the light guide module can be suppressed since the fluctuation amount of the coupling loss can be suppressed without increasing the height (thickness) of the core in the normal line direction of the light emitting portion or without increasing the distance between the light guide and the light receiving portion.

In the above configuration of the light guide according to present invention, at least one of the light incident surface or the light exit surface of the core is formed so that a distance between adjacent lines differs from each other at a plurality of lines representing a sectionalizing portion of the inclined surface shown in a plane when projected to the plane orthogonal to the extending direction of the light guide.

In other words, at least one of the light incident surface of the light exit surface of the core is formed such that when the light incident surface or the light exit surface of the core is seen in the extending direction of the light guide, the distance between adjacent lines differs from each other at a plurality of lines representing the sectionalizing portion of the inclined surface. Thus, the reflection surface of the light can be irregularly formed, and the interference of light can be suppressed. Thus, a more stable light transmission can be carried out.

In the above configuration of the light guide according to present invention, at least one of the light incident surface or the light exit surface of the core formed in a stepwise manner in the direction of moving away from the end face so as to include a plurality of inclined surfaces includes a reflection plate for reflecting the light applied from the light source.

The reflection plate is configured by a thin film of a material having high reflectivity such as aluminum, or a wavelength filter for transmitting a specific wavelength. Thus, the reflection loss at the light incident surface or the light exit surface can be reduced, and a more stable light transmission can be carried out.

A light guide module according to the present invention includes: the light guide; a light emitting portion for irradiating a light incident surface of the light guide with light; a light receiving portion for receiving light exit from a light exit surface of the light guide; a light emission driving portion for driving light emission of the light emitting portion based on an externally input electrical signal; and an amplifier for amplifying the electrical signal output from the light receiving portion and outputting the amplified electric signal to outside.

According to the above configuration, a light guide module capable of reducing the loss of light in light transmission and enabling stable light transmission with a simple configuration can be provided.

In the above configuration of the light guide according to present invention, the light emitting portion irradiates the light guide with light from a lateral direction in an extending direction of the light guide; and the light guide introduces the light applied from the light emitting portion into the core by reflecting at the light incident surface.

In the above configuration of the light guide according to present invention, the light receiving portion receives light from the lateral direction in the extending direction of the light guide from the light guide; and the light guide exits the light transmitted through the light guide with respect to the light receiving portion by reflecting at the light exit surface.

According to the above configuration, the light emitting portion and the light receiving portion are arranged in the lateral direction in the extending direction of the light guide with respect to the light guide. Thus, if the light guide needs to be arranged parallel to the substrate surface, the light emitting portion and the light receiving portion are installed between the light guide and the substrate surface to emit or receive the light in the normal line direction of the substrate surface. Such configuration facilitates mounting than the configuration in which the light emitting portion and the light receiving portion are installed so as to emit and receive light parallel to the substrate surface, and can be more miniaturized.

Other objects, characteristics, and excelling aspects of the present invention should become apparent from the following description. The advantages of the present invention will become apparent from the following description with reference to the accompanied drawings.

Other aspects and advantages of the invention will be apparent from the following description and the appended claims.

Figure 1:
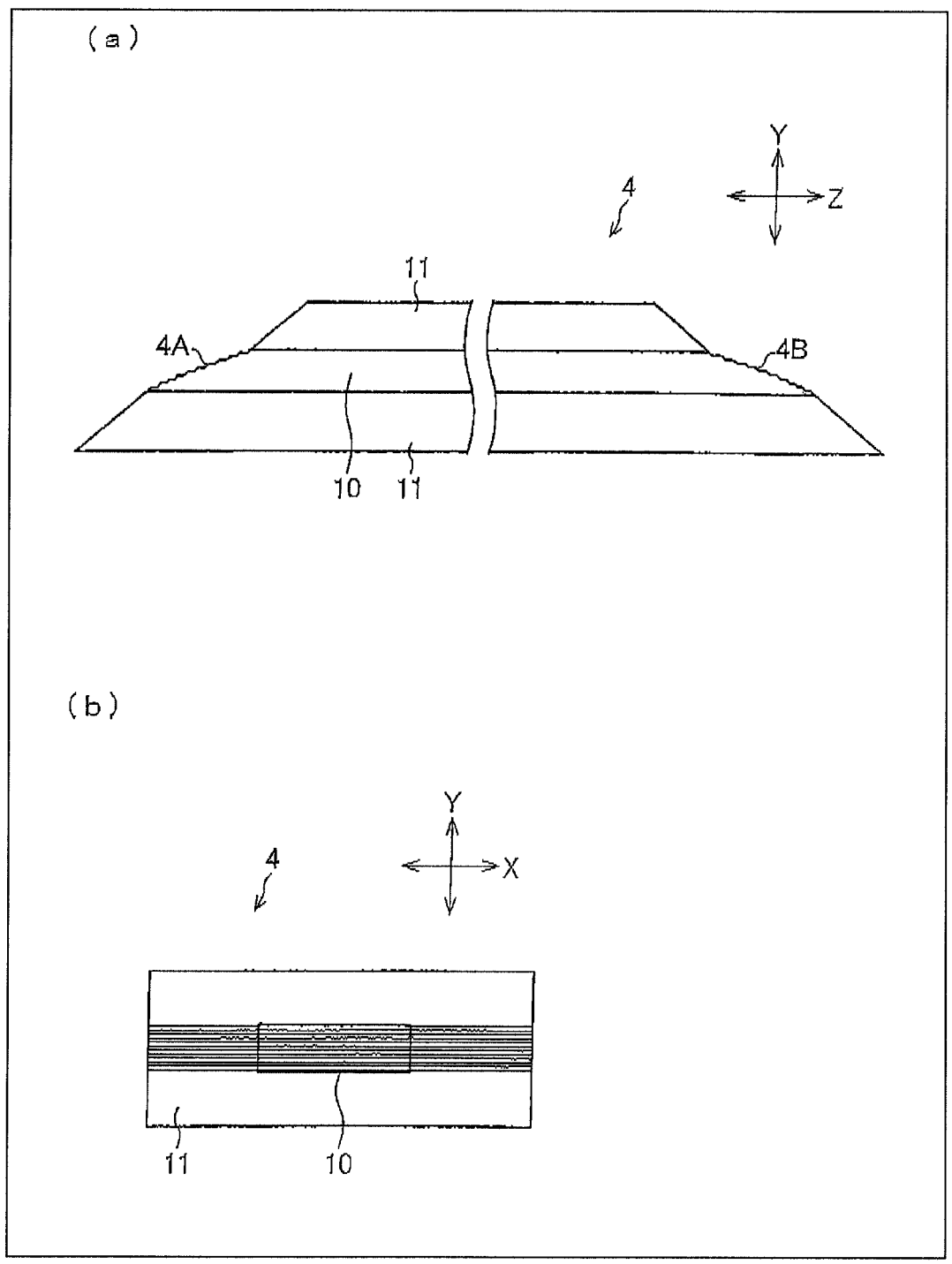
FIG. 1 shows a cross-sectional view and a front view of a light guide in one embodiment of the present invention.

DESCRIPTION OF SYMBOLS 1 light guide module
2 light transmission processing unit
3 light reception processing unit
4 light guide
4A light incident surface
4B light exit surface
5 package
6 light emission driving portion
7 light emitting portion
8 amplifier
9 light receiving portion
10 core
11 clad
12 electrical wiring
13 protective film
14 reflection mirror (reflection plate)

BEST MODE FOR CARRYING OUT THE INVENTION

Hereinafter, preferred embodiments of the present invention will be described with reference to the drawings.

(Configuration of Light Guide Module)

Figure 2:
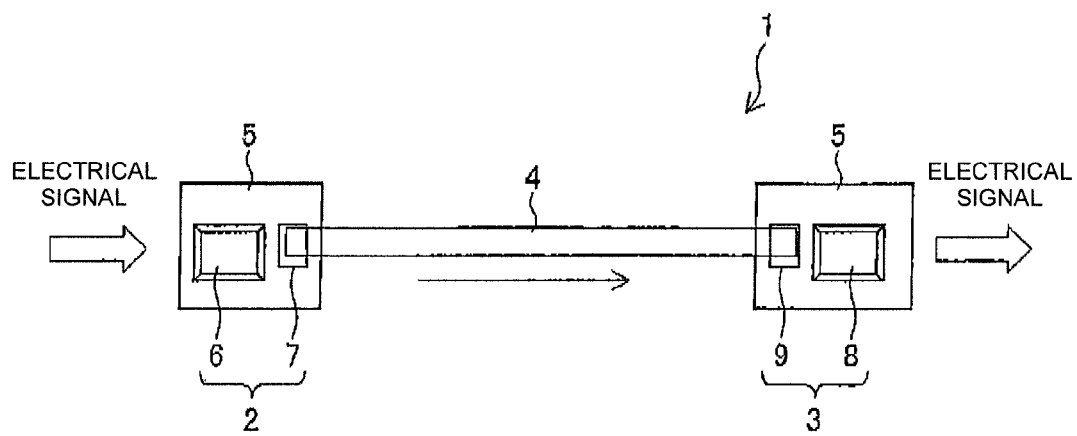
FIG. 2 is a view showing a schematic configuration of a light guide module according to the present embodiment.

FIG. 2 shows a schematic configuration of a light guide module 1 according to the present embodiment. As shown in the figure, the light guide module 1 includes a light transmission processing unit 2, a light reception processing unit 3, a light guide 4, and a package 5.

The light transmission processing unit 2 has a configuration including a light emitting drive portion 6 and a light emitting portion (optical element) 7. The light emitting drive portion 6 drives the light emission of the light emitting portion 7 based on an electrical signal inputted from the outside. The light emitting drive portion 6 is configured by a light emission drive IC (Integrated Circuit). Although not shown in the figure, the light emitting drive portion 6 includes an electrical connecting part with respect to an electrical wiring for transmitting the electrical signal from the outside.

The light emitting portion 7 emits light based on a drive control by the light emitting drive portion 6. The light emitting portion 7 is configured by a light emitting element such as VCSEL (Vertical Cavity-Surface Emitting Laser). A light incident side end of the light guide 4 is irradiated with the light emitted from the light emitting portion 7 as a light signal.[0044]

The light reception processing unit 3 has a configuration including an amplifier 8 and a light receiving portion (optical element) 9. The light receiving portion 9 receives the light serving as a light signal exit from a light exit side end of the light guide 4, and outputs an electrical signal through photoelectric conversion. The light receiving portion 9 is configured by a light receiving element such as PD (Photo-Diode).

The amplifier 8 amplifies the electric signal outputted from the light receiving portion 9 and outputs the same to the outside. The amplifier 8 is configured by amplification IC, for example. Although not shown, the amplifier 8 includes an electrical connecting part with respect to the electrical wiring for transmitting the electrical signal to the outside.

The light guide 4 is a medium for transmitting the light exit from the light emitting portion 7 to the light receiving portion 9. The details of the configuration of the light guide 4 will be hereinafter described.

The package 5 mounts the light transmission processing unit 2 or the light reception processing unit 3, and the light guide 4. The electrical wiring 12 (see FIG. 4) mounted on the package 5 connects a light emission driving portion 6 and a light emitting portion 7, and an amplifier 8 and a light receiving portion 9 to transmit the electrical wiring. Specifically, a flexible print substrate (FPC), a coaxial cable, a lead frame, and the like are used.

Figure 3:
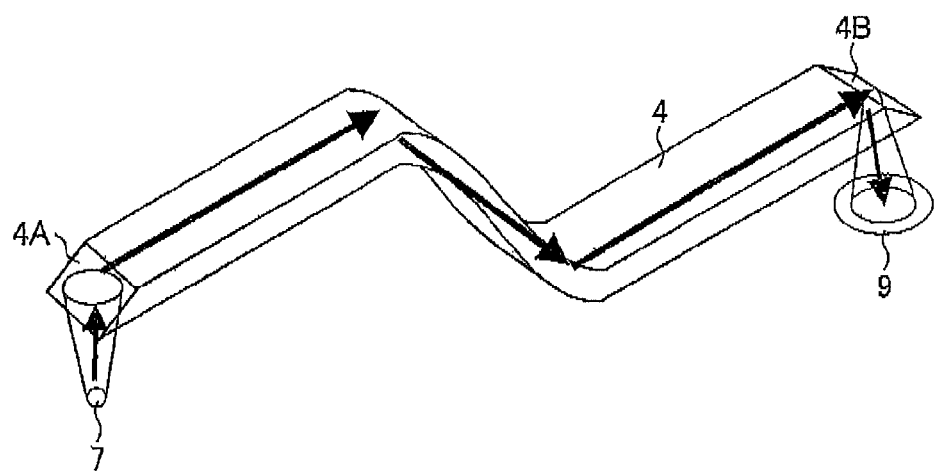
FIG. 3 is a view schematically showing a state of light transmission in the light guide.

FIG. 3 schematically shows the state of light transmission in the light guide 4. As shown in the figure, the light guide 4 is configured by a column-shaped member having flexibility. A light incident surface 4A is arranged at the light incident side end of the light guide 4, and a light exit surface 4B is arranged at the light exit side end. The light incident surface 4A and the light exit surface 4B are arranged while inclined in the light transmission direction in a case where the light is transmitted through the core 10.

The light emitted from the light emitting portion 7 enters the light incident side end of the light guide 4 from a direction perpendicular to the light transmission direction of the light guide 4. The incident light is advanced through the light guide 4 by being reflected at the light incident surface 4A. The light advanced through the light guide 4 and reached the light exit side end is reflected at the light exit surface 4B to be exit in a direction perpendicular to the light transmission direction of the light guide 4. The exit light is applied to the light receiving portion 9, and subjected to photoelectric conversion in the light receiving portion 9.

According to such configuration, the light emitting portion 7 and the light receiving portion 9 are arranged in the lateral direction in the light transmission direction with respect to the light guide 4. Thus, when the light guide 4 needs to be arranged parallel to the substrate surface (mounting surface in package 5), the light emitting portion 7 and the light receiving portion 9 are installed between the light guide 4 and the substrate surface so as to emit and receive the light in the normal line direction of the substrate surface. This configuration facilitates mounting than the configuration in which the light emitting portion 7 and the light receiving portion 9 are installed so as to emit light parallel to the substrate surface, and can be more miniaturized. This is because the general configuration of the light emitting portion 7 and the light receiving portion 9 has a larger size in the direction perpendicular to the direction of emitting and receiving light than the size in the direction of emitting and receiving light. Furthermore, application can also be made to a configuration using a light emitting element and a light receiving element directed for plane mounting in which the electrode is in the same plane.

Figure 4:
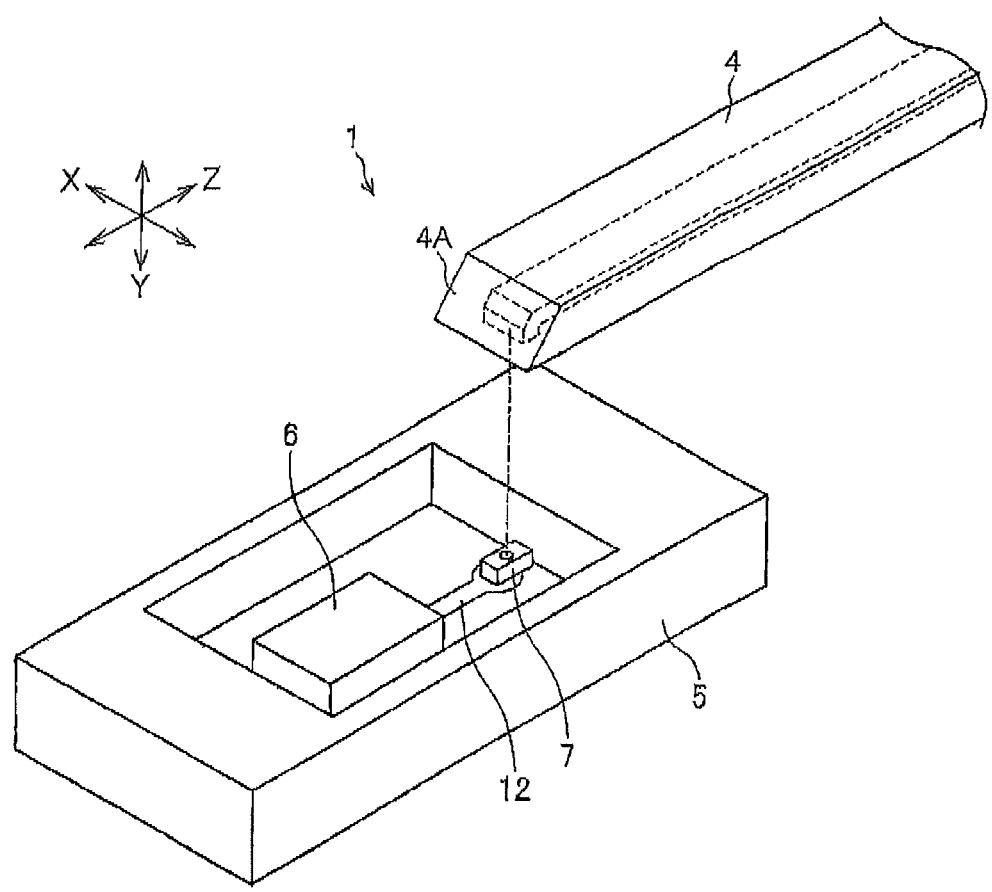
FIG. 4 is a perspective view showing a schematic configuration of the light guide module according to the present embodiment.
Figure 5:
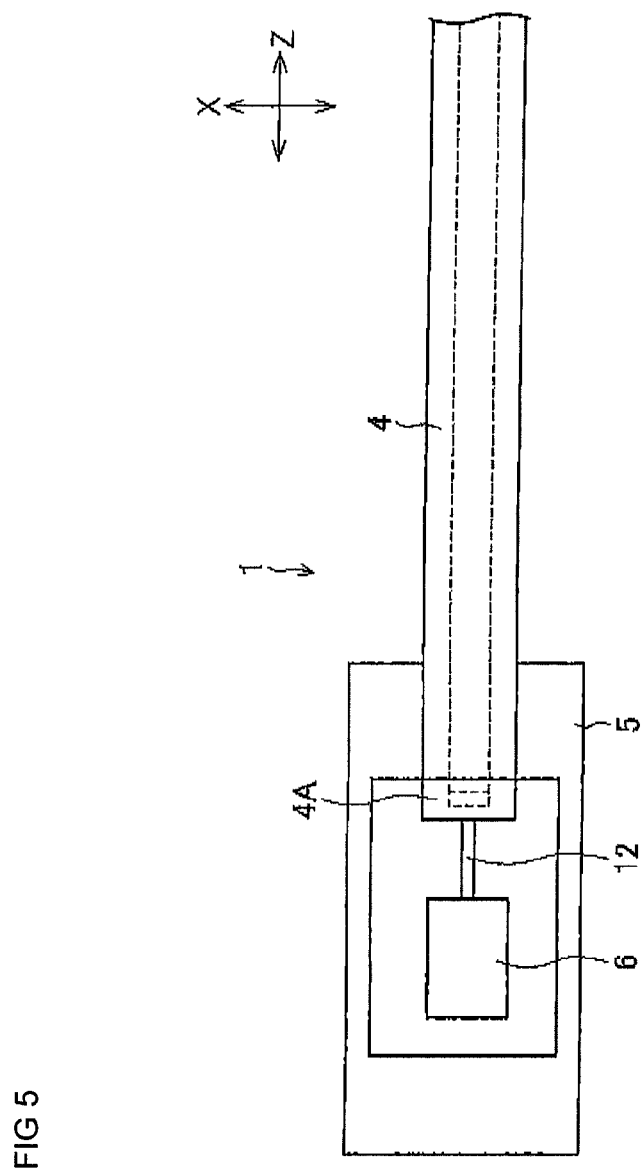
FIG. 5 is a top view showing a schematic configuration of the light guide module shown in FIG. 4.

One example of a light coupling method of the light guide 4 and the light emitting portion 7 and the light guide 4 and the light receiving portion 9 will be described using FIGS. 4 and 5 along with the manufacturing method of the light guide module 1. The light coupling method of the light guide 4 and the light emitting portion 7 and the light coupling method of the light guide 4 and the light receiving portion 9 respectively have the same configuration, and thus the light coupling method of the light guide 4 and the light emitting portion 7 will be described for the sake of convenience of the explanation. In FIG. 4, the extending direction of the light guide 4 is the Z direction, the normal line direction with respect to the light emitting surface of the light emitting portion 7 orthogonal to the Z direction is the Y direction, and the direction perpendicular to the Z-Y plane, that is, lateral width (longitudinal) direction at the end face of the light guide 4 is the X direction.

First, the light emission driving portion 6 and the light emitting portion 7 are mounted on the bottom surface of the package 5 fixed with a jig and the like through a method such as soldering, and the light emission driving portion 6 and the light emitting portion 7 are connected with the electrical wiring 12. An adhesive is then applied to the surface for mounting the light guide 4 in the package 5. Various types of commercially available adhesive may be used. The light guide 4 is then handled using an air chuck and the like, and position adjustment of the light guide 4 and the light emitting portion 7 is performed with an image recognition device (not shown) installed on the upper side (Y direction) of the package 5. The light guide 4 is mounted and adhered to the package 5 at a position a light incident region in the light incident surface 4A of the light guide 4 and a light emitting region of the light emitting portion 7 coincide in the image of the image recognition device. The light guide 4 and the light emitting portion 7 thus can be light coupled.

However, in the manufacturing step of the light guide module 1, even slight variation is generated when mounting the light emitting portion 7 or the light guide 4 to the package 5. Specifically, slight positional shift occurs when mounting to the package 5, or positional shift due to contraction in curing of the adhesive occurs. The positional shift fluctuates the coupling loss in the light transmission in the light guide 4 and adversely affects the stability of the light transmission. Therefore, the fluctuation amount of the coupling loss needs to be suppressed to perform a stable light transmission. However, suppressing the fluctuation amount of the coupling loss is not enough. This is because even if the fluctuation amount of the coupling loss is suppressed, the light quantity received by the light receiving portion 9 fluctuates if the bending loss, i.e., the loss of light that occurs when the light guide 4 is bent increases. Thus, stable light transmission becomes difficult. Therefore, it is important to suppress the fluctuation amount of the coupling loss without increasing the bending loss, i.e., the loss of light that occurs by bend to realize a stable light transmission.

(Coupling Loss, Bending Loss)

The coupling loss and the bending loss, which are the loss of light that occurs in light transmission of the light guide 4 will be described in detail.

The coupling loss is the loss of light that occurs when the light from the light source (correspond to light emitting portion 7) enters the light guide 4. This will be specifically described below. A spacing of a certain extent is formed between the light emitting portion 7 and the light guide 4. This is to absorb the error in the installation position of the light emitting portion 7 and the light guide 4 and the error in parts size, and to ensure an electrical wiring space when mounting the light emitting portion 7 to the package 5. In other words, the light emitted from the light emitting portion 7 enters the light guide 4 through the spacing. The light emitted from the light emitting portion 7 thus does not completely enter the light guide 4, whereby loss of light occurs, which is the coupling loss. Similar coupling loss occurs on the light exit side. In other words, the light exit from the light guide 4 is not completely received by the light receiving portion 9, whereby loss of light occurs, which is the coupling loss.

The bending loss is the loss of light that occurs when the light guide 4 is bent. This will be specifically described below. The light transmitted through the light guide 4 is transmitted in the light transmission direction by repeating total reflection in the core 10. The incident angle with respect to the inner surface of the core 10 needs to be greater than or equal to a predetermined angle to enable the light to be totally reflected. If the light guide 4 is bent, the probability the incident light of the light that hits the inner surface of the core 10 opposite to the bent direction becomes small becomes high. The transmitted light is thus not totally reflected at the inner surface of the core 10, and some of the light transmits to the outside. The loss of light that occurs here is the bending loss.

(Configuration of Light Guide)

FIG. 1 show a cross-sectional view and a front view of the light guide 4 in the present embodiment. As shown in the figure, the light guide 4 has a configuration including a columnar-shaped core 10 having the light transmission direction (Z direction) as the axis, and a clad 11 arranged to surround the periphery of the core 10. The core 10 and the clad 11 are made of material having translucency, and the index of refraction of the core 10 is higher than the index of refraction of the clad 11. The optical signal that entered the core 10 is transmitted in the light transmission direction by repeating total reflection inside the core 10.

The material for forming the core 10 and the clad 11 may be glass, plastic, and the like, but resin material of acryl, epoxy, urethane, silicon, and the like is preferably used to configure the light guide 4 having sufficient flexibility. The clad 11 may be made of gas such as air. Furthermore, similar effects can be obtained even if the clad 11 is used under an atmosphere of liquid having a smaller index of refraction than the core 10. The cross-sectional shape of the core 10 at the plane perpendicular to the light transmission direction is a rectangle.

As shown in the figure, the light incident surface 4A and the light exit surface 4B of the core 10 is formed in a stepwise manner in the extending direction (Z direction) of the light guide 4 to have a plurality of inclined surfaces. In other words, the end face of the core 10 has the inclined surface, where the orthogonal projection to the plane (X-Y plane) orthogonal to the extending direction (Z direction) of the light guide 4 has a rectangular shape, divided to a plurality of inclined surfaces parallel to the longitudinal direction of the rectangular shape and the plurality of inclined surfaces arranged while shifted in parallel without changing the respective inclined angle so that the inclined surface closer to the light emitting portion 7 is positioned in the direction (Z direction) of moving away from the end face of the light guide 4 so as to extend in the direction (Z direction) of moving away from the end face in a stepwise manner as a whole. Specifically, the light incident surface 4A and the light exit surface 4B include a plurality of inclined surfaces having an angle same as the inclined angle $\alpha$ of the light incident surface and the light exit surface in the conventional light guide, and are formed in a stepwise manner in the Z direction (direction of moving away from the end face of the light guide 4).

(Configuration of Light Guide and Light Emitting Portion)

Figure 6:
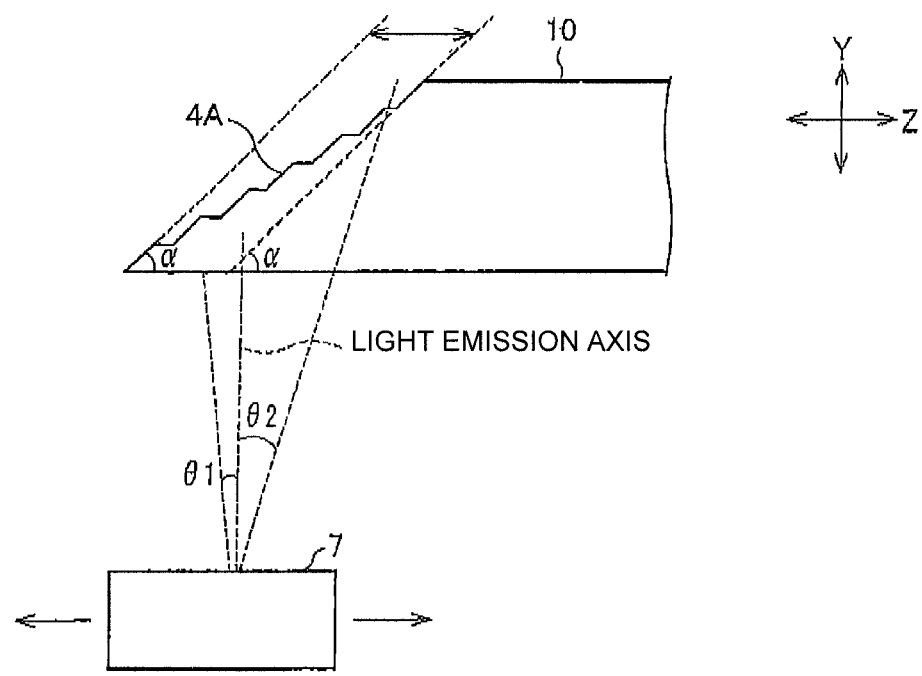
FIG. 6 is a cross-sectional view showing a light emitting region of the light emitted from a light emitting portion introduced into a core.

The configuration of the light guide 4 and the light emitting portion 7 will now be described. FIG. 6 is a cross-sectional view showing the light emitting region of the light emitted from the light emitting portion 7 introduced into the core 10. In the figure, the extending direction of the light guide 4 is the Z direction, and the normal direction with respect to the light emitting surface of the light emitting portion 7 orthogonal to the Z direction is the Y direction.

Figure 19:
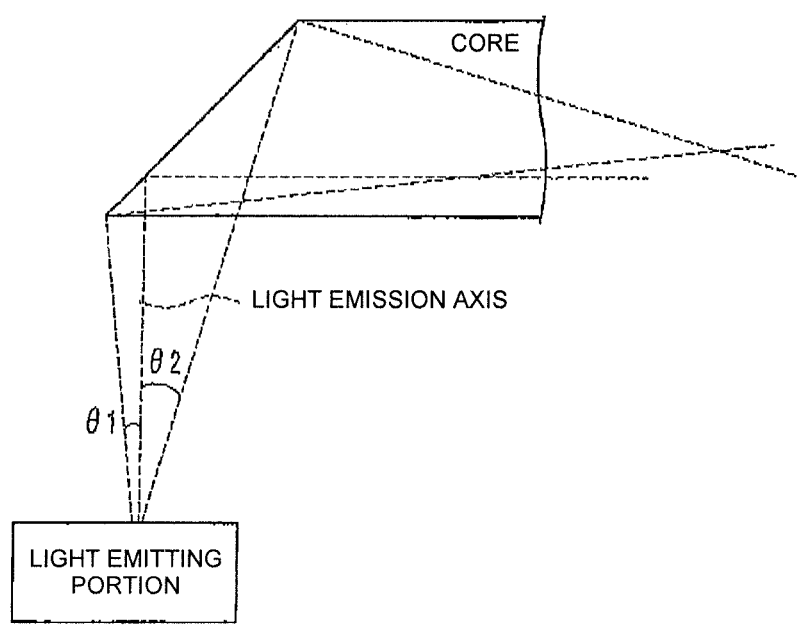
FIG. 19 is a cross-sectional view showing a light emitting region of the light emitted from a light emitting portion to be introduced into a light guide in the conventional light guide.
Figure 20:
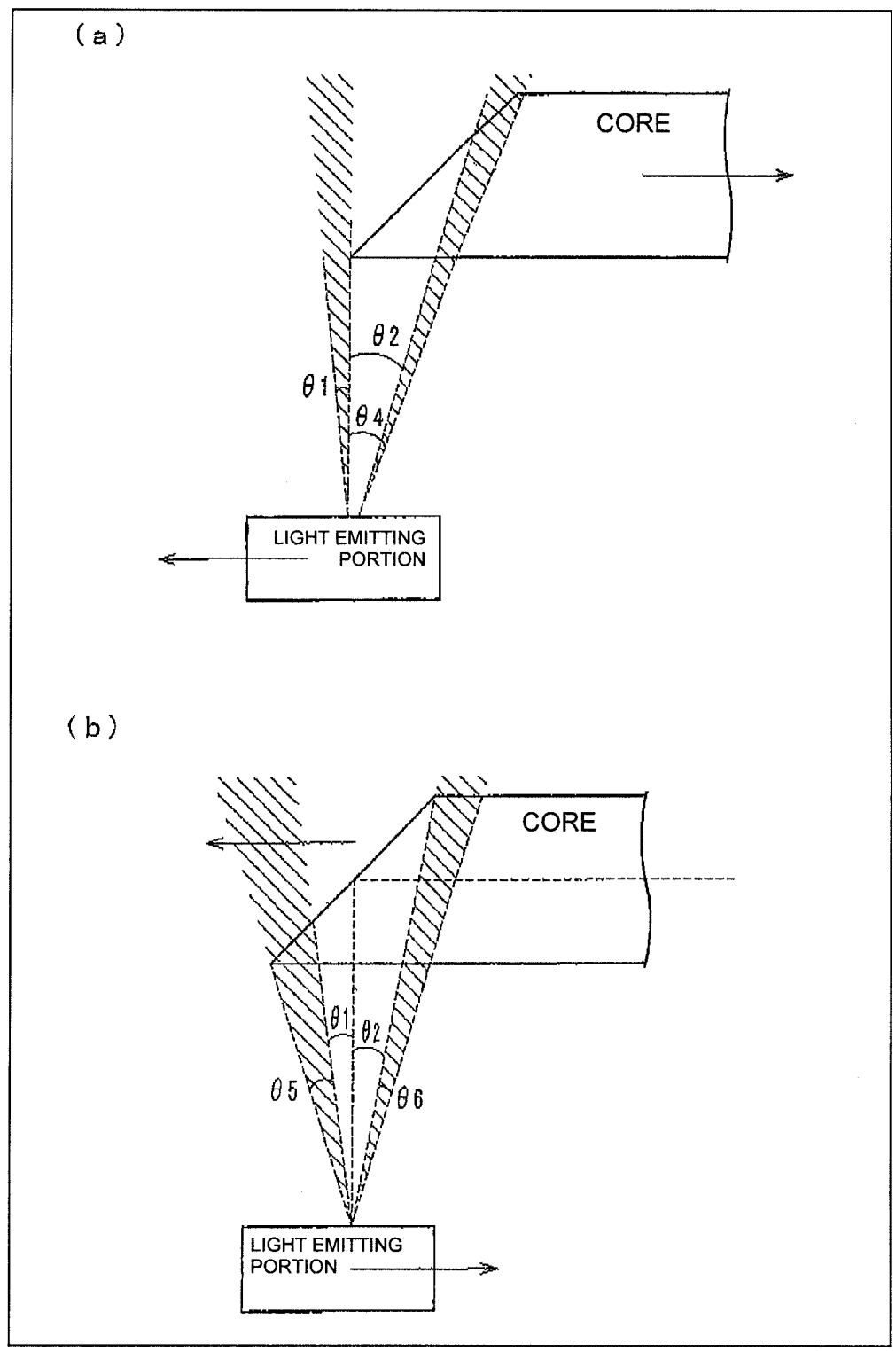
FIGS. 20(a) and 20(b) are cross-sectional views in a case where positional shift occurs when mounting the light emitting portion and the light guide in the conventional light guide.
Figure 21:
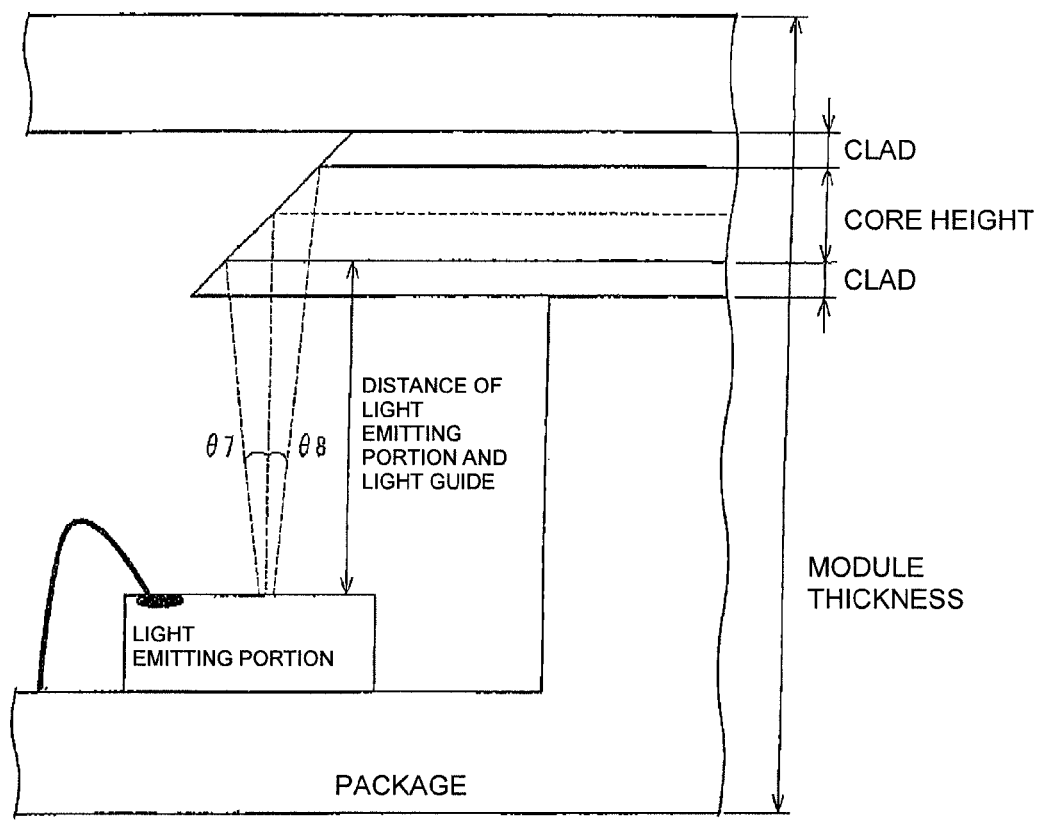
FIG. 21 is a cross-sectional view of a light guide module in a case where the light emitting portion and the light guide are mounted in a package in the conventional light guide.
Figure 22:
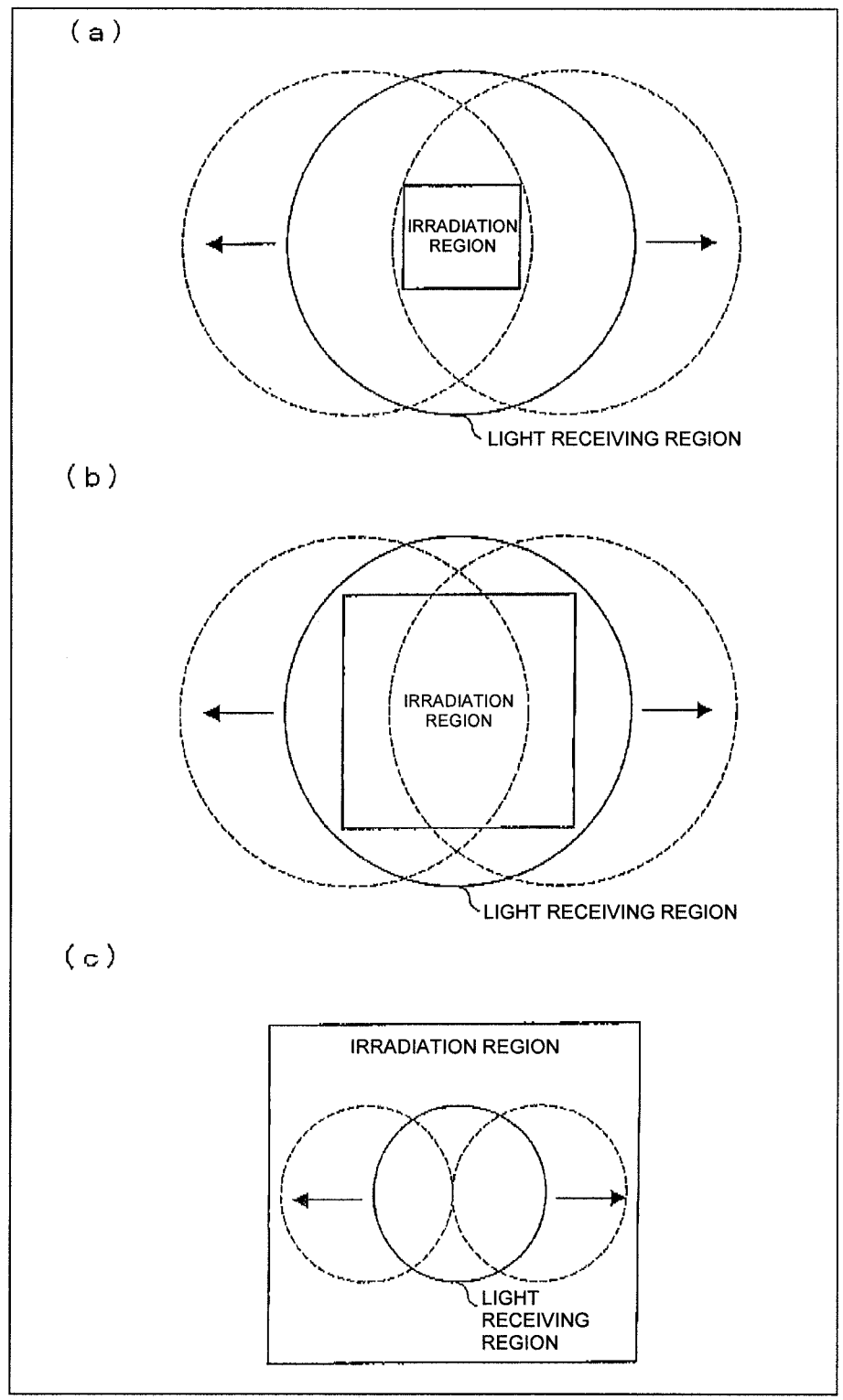
FIGS. 22(a) to (C) are top views showing a positional relationship of an irradiation region in the light receiving portion exit from the light guide and a light receiving region where the light receiving portion can receive light in the conventional light guide.
Figure 23:
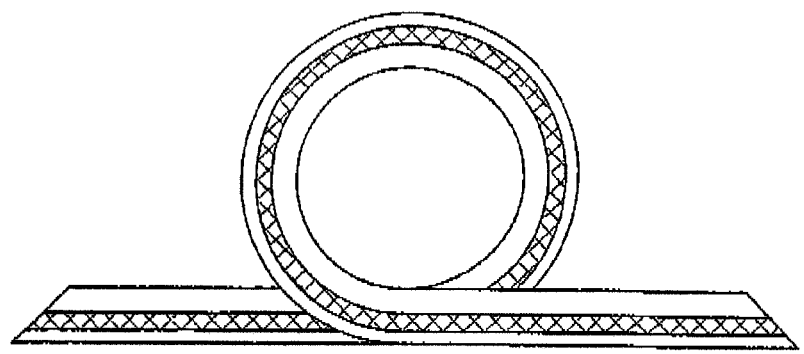
FIG. 23 is a cross-sectional view showing a state in which the light guide is bent.
Figure 24:
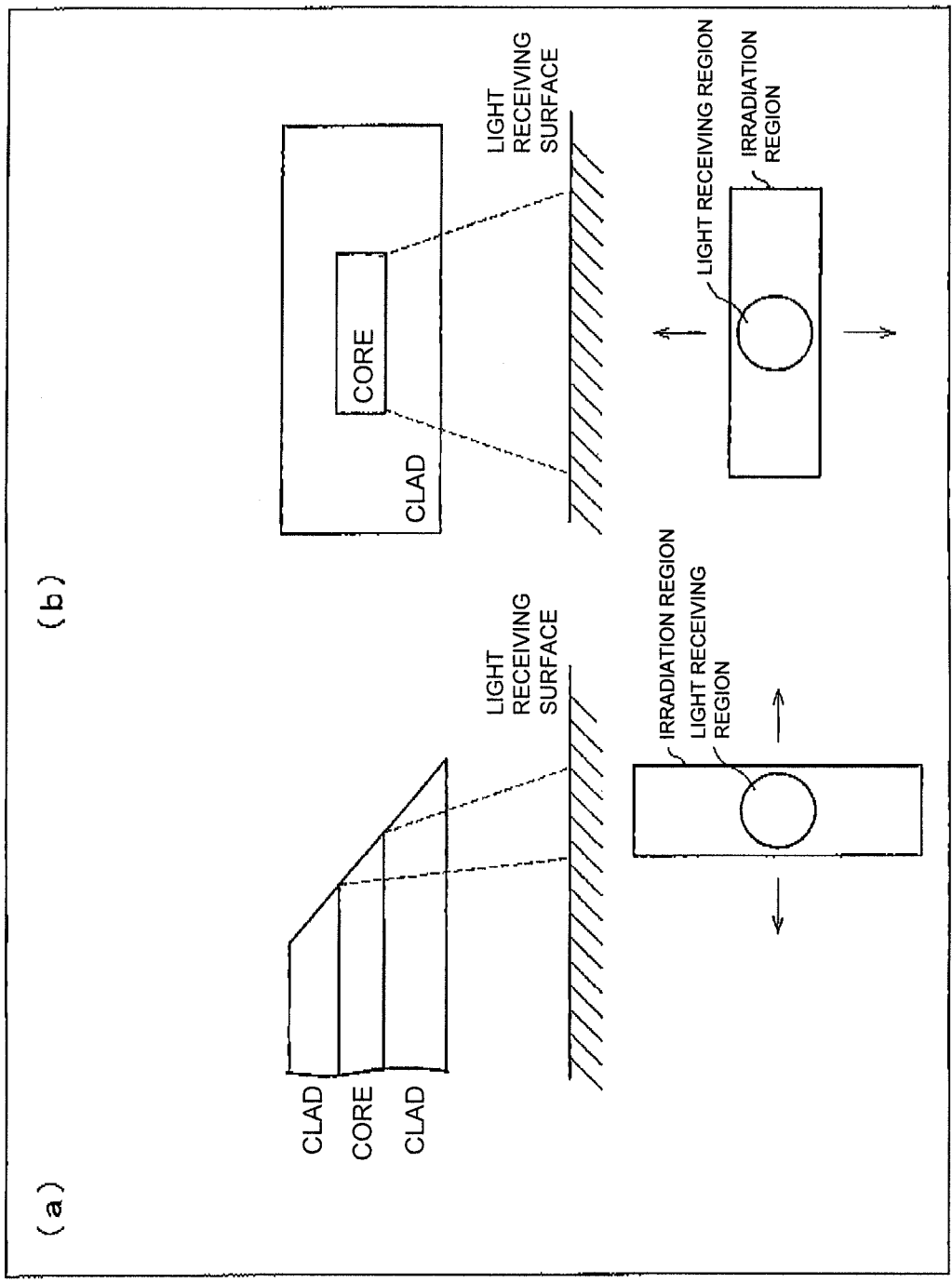
FIG. 24 is a view showing a positional relationship of the irradiation region of the light from the light guide to the light receiving portion and the light receiving region of the light receiving portion in the conventional light guide module.

The light emitting region of the light emitted from the light emitting portion 7 that can be introduced into the core 10 of the waveguide 4 is determined by the inclined angle of the light incident surface 4A and the index of refraction of the light guide 4. The $\theta 1$ and $\theta 2$ described in FIG. 19 showing the configuration of the conventional light guide are angles indicating the range the light emitted from the light emitting portion can be introduced into the core, and respectively represent the angle with respect to the light emission axis in the Y direction in the light emitting portion. In other words, the light emitted in the range of $\theta 1$ and $\theta 2$ is totally reflected at the light incident surface and introduced into the core.

In the conventional configuration, the positional relationship between the region of the light incident surface of the light guide and the range ($\theta 1$ and $\theta 2$) of the light that can be introduced into the light guide fluctuates by variation in mounting the light emitting portion, variation in mounting the light guide, and the like, and the light quantity introduced into the light guide is reduced. In other words, the coupling loss, i.e., the loss of light that occurs when the light from the light emitting portion enters the light guide increases.

In the light guide 4 according to the present embodiment, on the other hand, the light incident surface 4A includes a plurality of inclined surfaces having an angle same as the inclined angle $\alpha$ of the light incident surface in the conventional light guide and is formed in a stepwise manner in the Z direction, as shown in FIG. 6.

According to such configuration, the region of the light incident surface 4A can be made larger than the range ($\theta 1$ and $\theta 2$) of the light that can be introduced into the light guide 4. Thus, when variation in mounting occurs, the light (light of range of $\theta 1$ in FIG. 6), which is outside the irradiation region at the conventional light incident surface, can be reliably reflected at the light incident surface 4A and introduced into the light guide 4. Thus, even if variation in mounting occurs, the light quantity introduced into the light guide 4 can be maintained constant, and thus the coupling loss, i.e., the loss of light that occurs when the light from the light emitting portion 7 enters the light guide 4 can be reduced. Therefore, according to the light guide 4 of the present embodiment, a more stable light transmission can be performed compared to the conventional configuration.

A method of increasing the thickness (height in Y direction) of the core 10 is considered to reduce the coupling loss, but is not preferable as this leads to increase in the bending loss. Therefore, the thickness of the core 10 is preferably the same or smaller than the conventional configuration. The coupling loss thus can be reduced without increasing the bending loss.

(Configuration of Light Guide and Light Receiving Portion)

Figure 7:
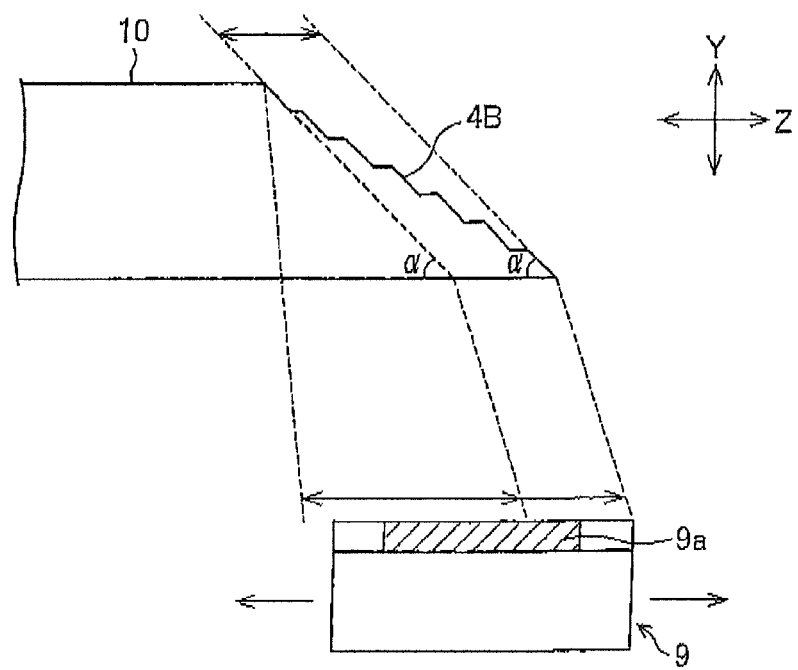
FIG. 7 is a cross-sectional view showing an irradiation region of the light exit from the light guide to the light receiving portion.

The configuration of the light guide 4 and the light receiving portion 9 will now be described. FIG. 7 is a cross-sectional view showing the irradiation region to the light receiving portion 9 of the light exit from the light guide 4.

As shown in the figure, the inclined surface of the light exit surface has a planar shape in the conventional light guide. In other words, the light exit surface (dotted line portion in FIG. 7) has a linear shape when the figure is seen from the upper side of the plane of drawing. Thus, some of the light exit from the light guide is applied outside the range of the light receiving region 9a of the light receiving portion due to variation in mounting the light receiving portion, variation in mounting the light guide, and the like, and the light quantity received by the light receiving portion is reduced. In other words, the coupling loss, i.e., the loss of light that occurs when the light exit from the light guide is received by the light receiving portion.

In the light guide 4 according to the present embodiment, on the other hand, the light exit surface 4B includes a plurality of inclined surfaces having an angle same as the inclined angle α of the light exit surface in the conventional light guide and is formed in a stepwise manner in the Z direction, as shown in the figure.

According to such configuration, the irradiation region to the light receiving portion 9 of the light exit from the light guide 4 can be extended than the conventional configuration. In the configuration shown in the figure, the irradiation region to the light receiving portion 9 of the light exit from the light guide 4 may be greater than the light receiving region 9a of the light receiving portion 9. Thus, when variation in mounting occurs, the light exit from the light guide 4 can be applied even to the region the light is not applied in the conventional configuration. That is, constant light is always applied to the light receiving region 9a of the light receiving portion 9a. Thus, even if variation in mounting occurs, the light quantity received by the light receiving portion 9 can be maintained constant, and thus the fluctuation amount of the coupling loss, i.e., the loss of light that occurs when the light exit from the light guide 4 is received by the light receiving portion 9 can be suppressed. Therefore, according to the light guide 4 of the present embodiment, a more stable light transmission can be performed compared to the conventional configuration.

A method of reducing the coupling loss by increasing the thickness (height in Y direction) of the core 10 is not preferable as this leads to increase in the bending loss, as mentioned above. Therefore, the thickness of the core 10 is preferably the same or smaller than the conventional configuration. The coupling loss thus can be reduced without increasing the bending loss.

Furthermore, according to the light guide 4 of the present embodiment, the irradiation region of the light from the light guide 4 can be enlarged without setting the distance from the light guide 4 to the light receiving surface of the light receiving portion 9 long, and thus the light guide module 1 can be more miniaturized and thinned.

In the present embodiment, both the light incident surface 4A and the light exit surface 4B of the core 10 are formed in a stepwise manner in the extending direction of the light guide 4, but either one of the light incident surface 4A or the light exit surface 4B may be formed in a stepwise manner in the extending direction of the light guide 4. In such configuration as well, an effect in that the coupling loss can be reduced and a stable light transmission can be performed is obtained.

If the light incident surface 4A and the light exit surface 4B of the core 10 are formed planarly in the extending direction of the light guide 4 at an angle (acute angle) smaller than the inclined angle α of the light incident surface in the conventional light guide, the incident angle of the light applied from the light emitting portion 7 with respect to the light incident surface 4A exceeds the critical angle, and thus the light is transmitted without being totally reflected and becomes a loss. Therefore, the inclined angle α of the light incident surface 4A and the light exit surface 4B of the core 10 is preferably set in a range of between 30 degrees and 60 degrees, and more preferably set to 45 degrees or approximately 45 degrees.

(First Variant)

Figure 8:
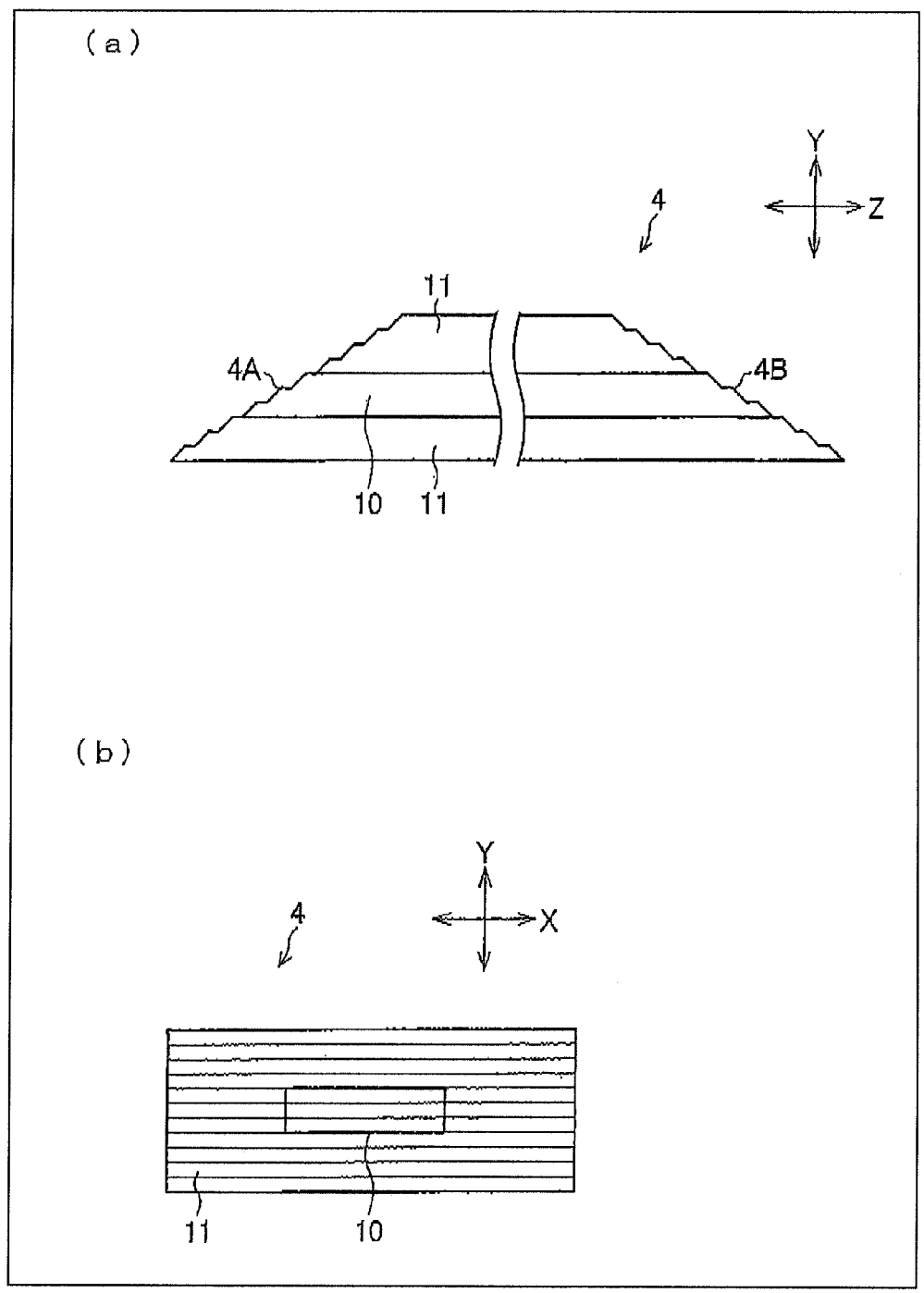
FIG. 8 shows a cross-sectional view and a front view of a light guide serving as a variant.

A variant of the configuration shown in FIG. 1 will be described for the configuration of the light guide 4 of the present embodiment. FIG. 8 shows a cross-sectional view and a front view of the light guide 4 serving as a first variant.

In the configuration shown in FIG. 1, the light incident surface 4A and the light exit surface 4B of the core 10 are formed in a stepwise manner in the extending direction (Z direction) of the light guide 4 so as to include a plurality of inclined surfaces, but in the configuration of the first variant, the inclined end faces of the light guide 4, that is, the end faces of the core 10 and the clad 11 are formed in a stepwise manner in the extending direction (Z direction) of the light guide 4 to include a plurality of inclined surfaces, as shown in FIG. 8.

Figure 9:
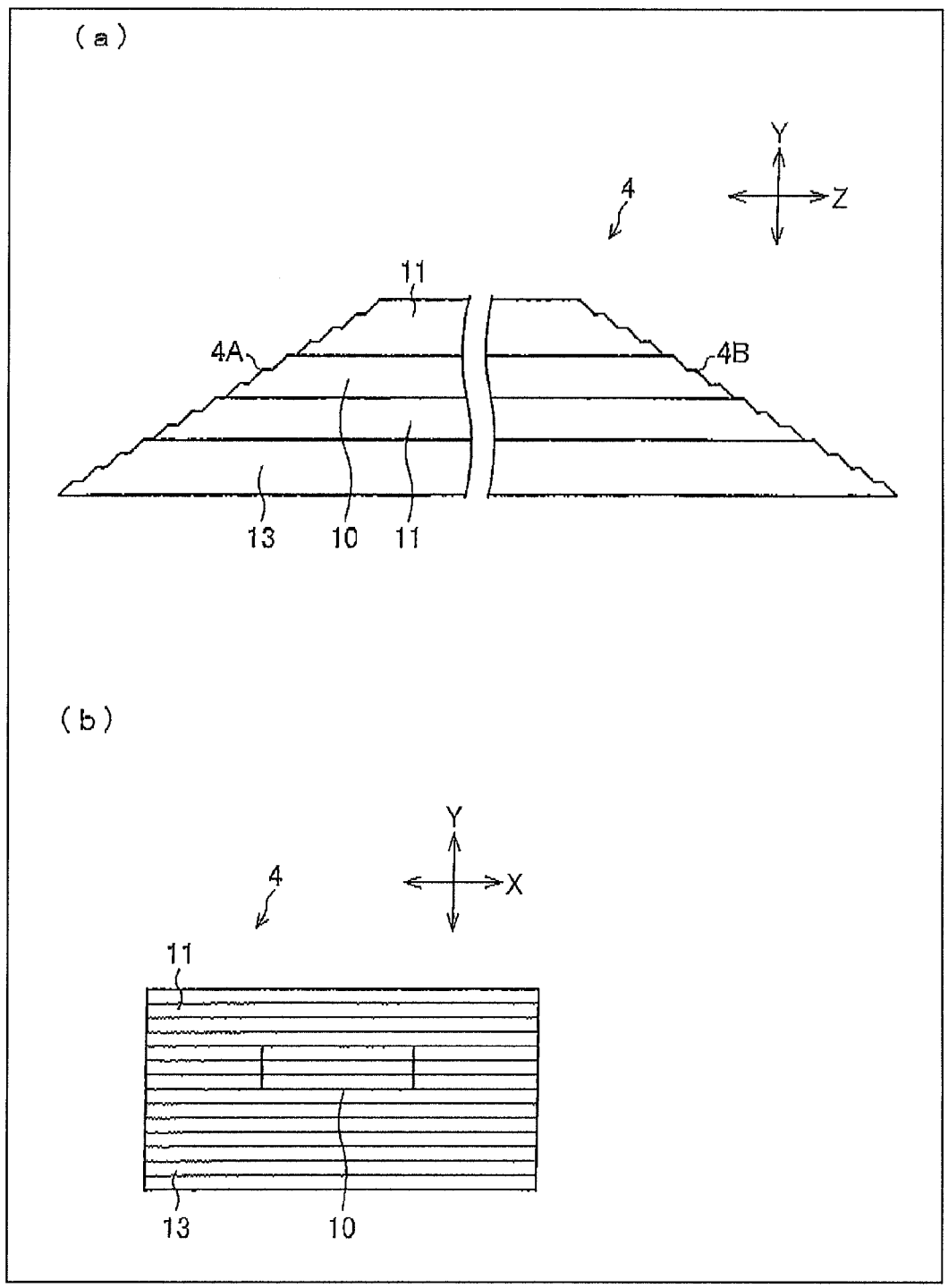
FIG. 9 is a cross-sectional view and a front view in a case where a protective film is arranged on the light guide serving as the variant shown in FIG. 8.

As shown in FIG. 9, a protective film 13 may be covered on the clad 11 of the light guide 4.

(Second Variant)

Figure 10:
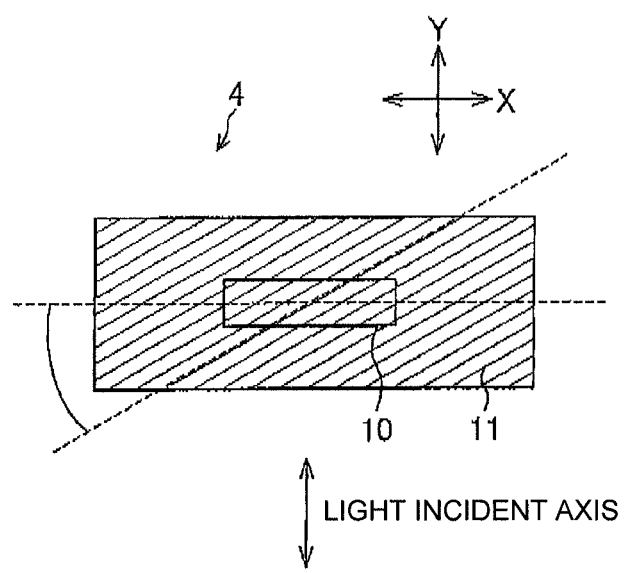
FIG. 10 is a front view of a light guide serving as another variant.

Another variant of the configuration shown in FIG. 1 will be described for the configuration of the light guide 4 of the present embodiment. FIG. 10 shows a front view of the light guide 4 serving as a second variant.

In the configuration shown in FIG. 1, the light incident surface 4A and the light exit surface 4B of the core 10 are formed in a stepwise manner in the extending direction (Z direction) of the light guide 4 to include a plurality of inclined surfaces in parallel to the width direction (X direction) of the light guide 4. In other words, the surfaces are formed so that the sectionalizing portion of the step (inclined surface) in the extending direction of the light guide 4, that is, the line at the end face of the core 10 shown in the front view of FIG. 1B is parallel to the X direction. In the configuration of the second variant, on the other hand, the surfaces are formed so that the sectionalizing portion of the step in the extending direction of the light guide 4, that is, the line at the end face of the core 10 (or the light guide) shown in FIG. 10 is not parallel to the X direction and has a predetermined angle, as shown in FIG. 10. The predetermined angle in the X direction is preferably set to a range of ±degrees. Thus, the region of the light incident surface 4A and the region of the light exit surface 4B of the core 10 can be enlarged.

Figure 11:
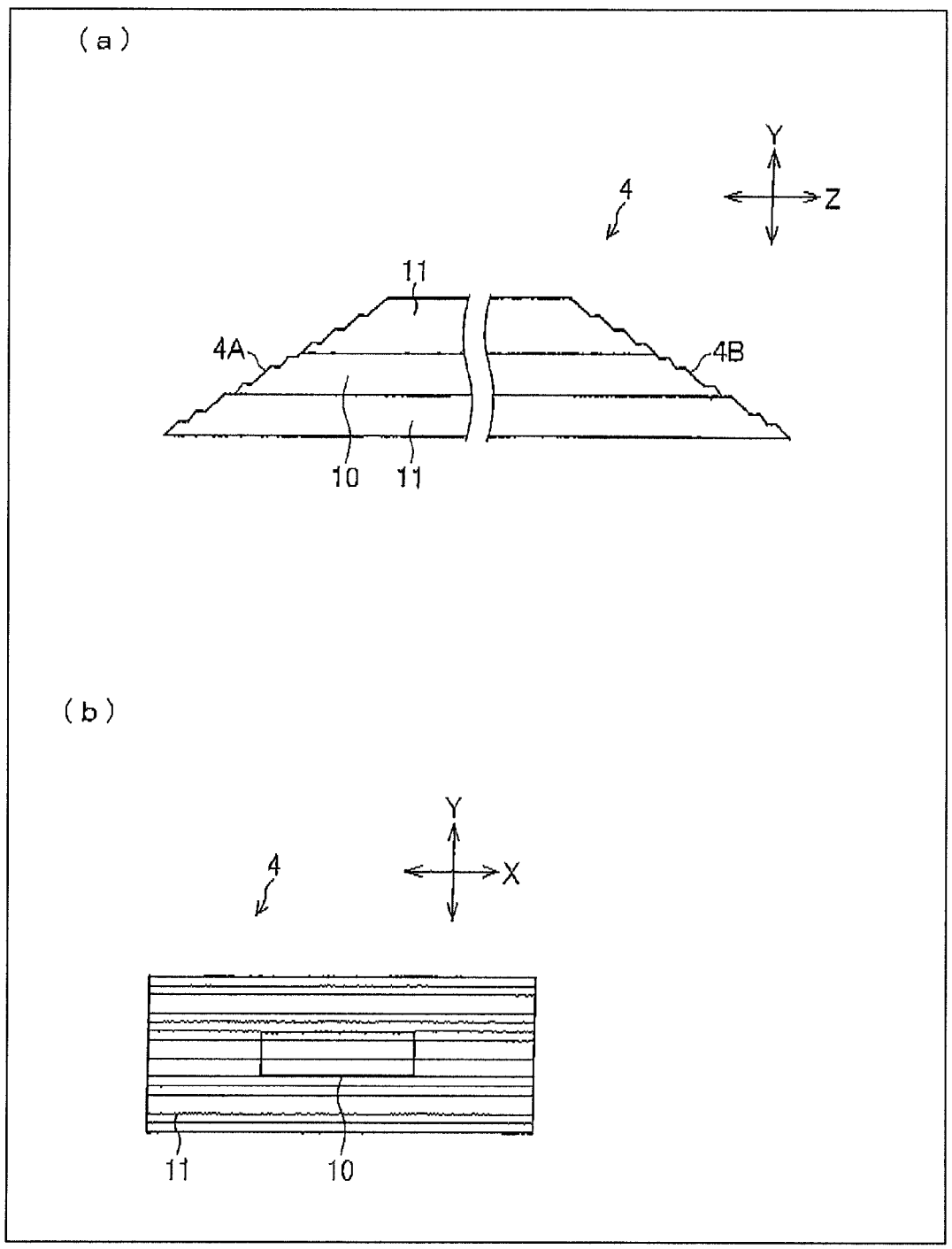
FIG. 11 is a cross-sectional view and a front view of a light guide serving as another variant.

Another variant of the configuration shown in FIG. 1 will be described for the configuration of the light guide 4 of the present embodiment. FIG. 11 shows a cross-sectional view and a front view of the light guide 4 serving as a third variant.

In the configuration shown in FIG. 1, the light incident surface 4A and the light exit surface 4B of the core 10 are formed in a stepwise and regular manner in the extending direction (Z direction) of the light guide 4 so as to include a plurality of inclined surfaces. In other words, the sectionalizing portion of the step (inclined surface) in the extending direction of the light guide 4 is regularly formed, that is, on a plurality of lines at the end face of the core 10 shown in the front view of FIG. 1, the distance between the adjacent lines is equal to each other. In the configuration of the second variant, on the other hand, the sectionalizing portion of the step in the extending direction of the light guide 4 is irregularly formed, that is, on a plurality of lines at the end face of the core 10 (or the light guide 4) shown in FIG. 11, the distance between the adjacent lines is different from each other, as shown in FIG. 11. Thus, compared to the configuration shown in FIG. 1, the reflection surface of the light can be irregularly formed, whereby interference of light can be suppressed and a more stable light transmission can be carried out.

(Fourth Variant)

Figure 12:
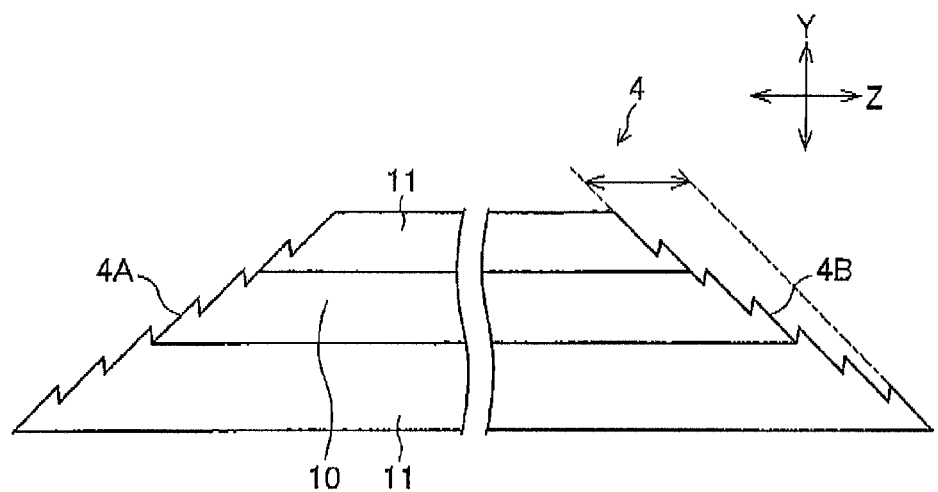
FIG. 12 is a cross-sectional view of a light guide serving as another variant.

Another variant of the configuration shown in FIG. 1 will be described for the configuration of the light guide 4 of the present embodiment. FIG. 12 shows a cross-sectional view of the light guide 4 serving as a fourth variant.

In the configuration shown in FIG. 1, the reflection surface (light incident surface 4A and light exit surface 4B) of the sectionalizing portion of the step in the extending direction of the light guide 4, that is, the reflection surface formed between the reflection surfaces formed at a predetermined angle (e.g., 45 degrees) is formed to be parallel to the X-Z plane. In the configuration of the fourth variant, on the other hand, the reflection surface between the reflection surfaces formed at a predetermined angle (e.g., 45 degrees) may be formed slanted with respect to the X-Z plane, as shown in FIG. 12. According to such configuration as well, the region of the light incident surface 4A and the region of the light exit surface 4B of the core 10 can be enlarged, and the fluctuation amount of the coupling loss can be suppressed.

(Fifth Variant)

Figure 13:
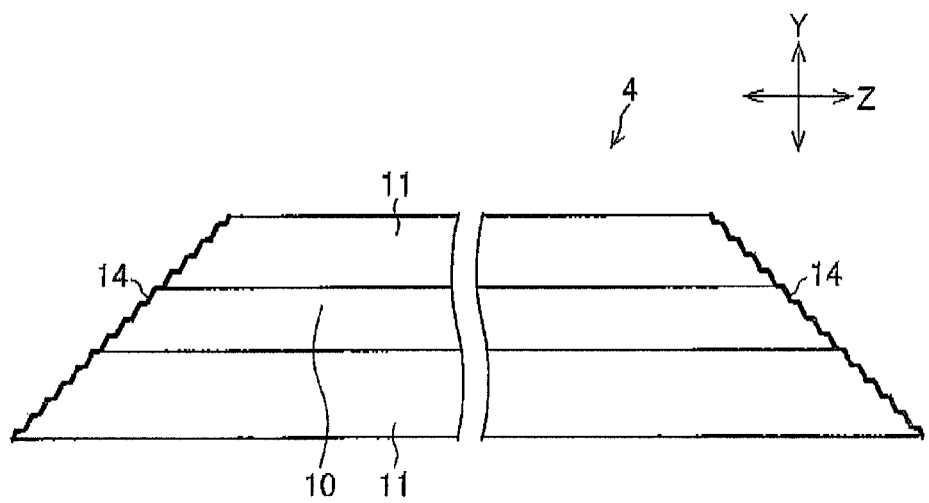
FIG. 13 is a cross-sectional view of a light guide serving as another variant.

Another variant of the configuration shown in FIG. 1 will be described for the configuration of the light guide 4 of the present embodiment. FIG. 13 shows a cross-sectional view of the light guide 4 serving as a fifth variant.

In such configuration, a reflection mirror (reflection plate) 14 is arranged on the light incident surface 4A and the light exit surface 4B. The reflection mirror 14 is configured by a thin film of a material having high reflectivity such as aluminum, or a wavelength filter for transmitting a specific wavelength. The reflection loss at the light incident surface 4A and the light exit surface 4B thus can be reduced, and a more stable light transmission can be performed.

(Sixth Variant)

Figure 14:
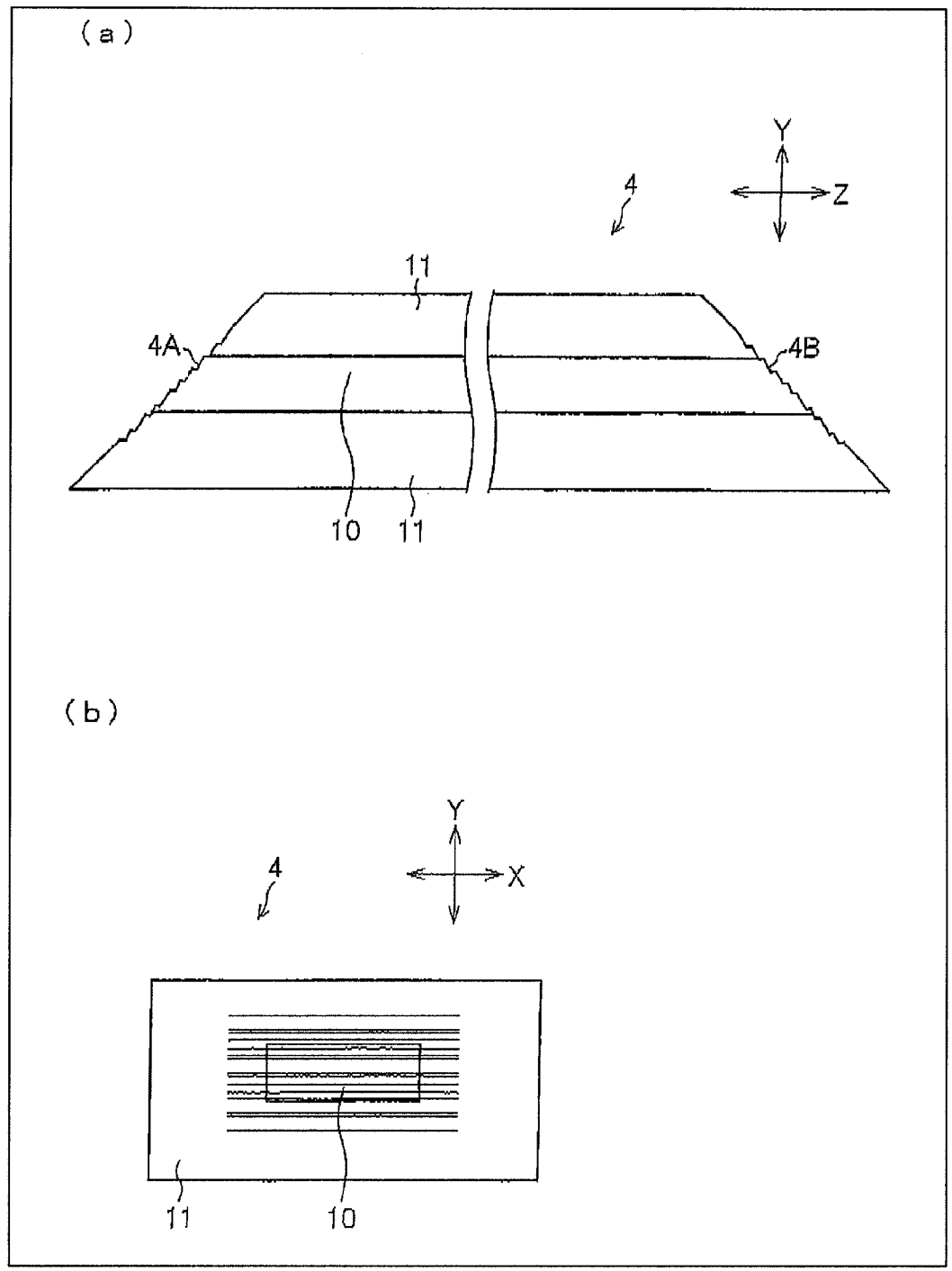
FIG. 14 is a cross-sectional view and a front view of a light guide serving as another variant.

Another variant of the configuration shown in FIG. 1 will be described for the configuration of the light guide 4 of the present embodiment. FIG. 14 shows a cross-sectional view and a front view of the light guide 4 serving as a sixth variant.

In such configuration, the light incident surface 4A and the light exit surface 4B at the periphery of the core 10 including the core 10 are formed in a stepwise and irregular manner in the extending direction (Z direction) of the light guide 4. In other words, on a plurality of lines at the region of the periphery of the core 10 including the core 10 shown in the front view of FIG. 14, the distance between the adjacent lines is different from each other. Thus, the interference of light can be suppressed and the manufacturing efficiency of both reflection surfaces can be enhanced compared to a case of regularly forming the light incident surface 4A and the light exit surface 4B of the core 10.

(Seventh Variant)

Figure 15:
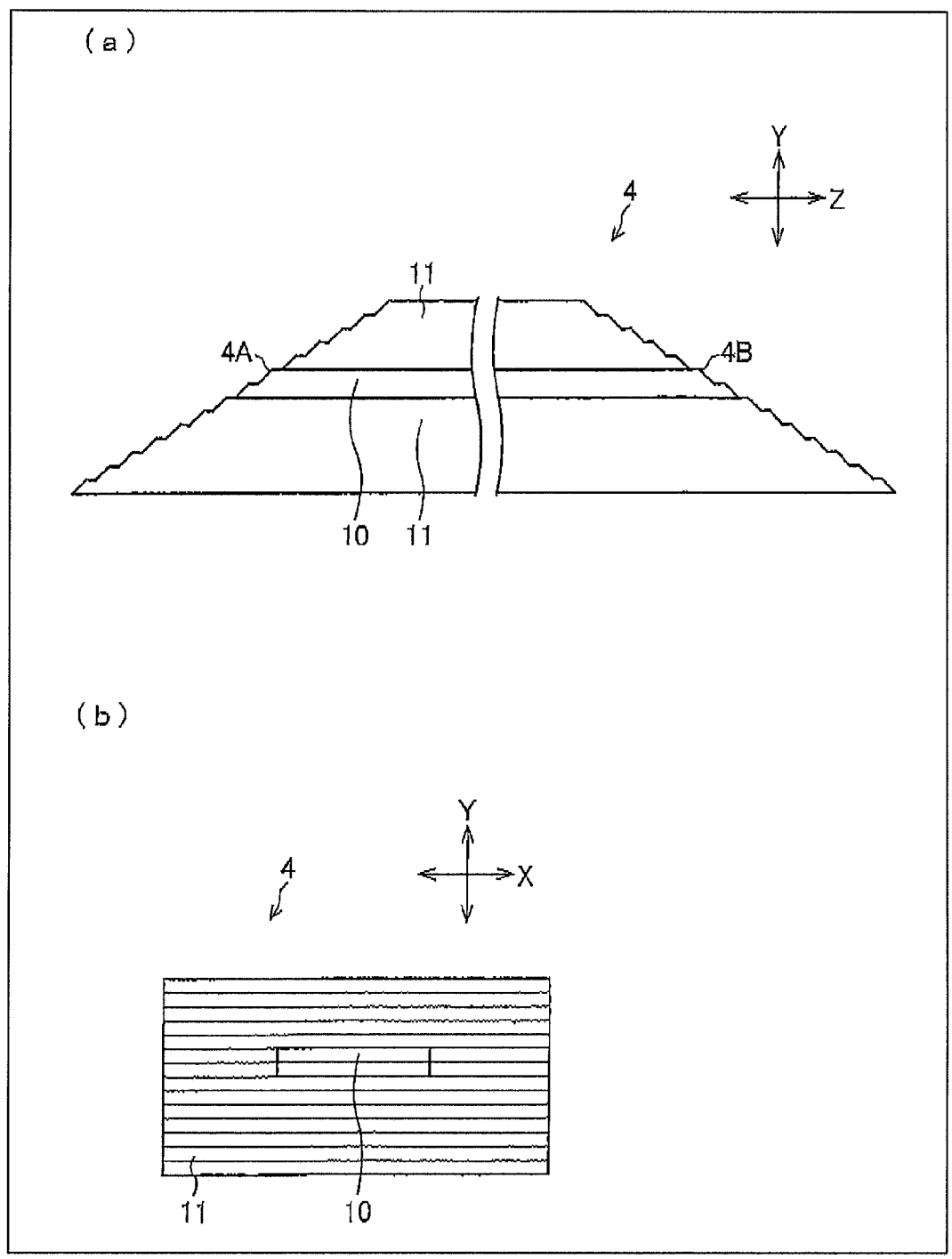
FIG. 15 is a cross-sectional view and a front view of a light guide serving as another variant.

Another variant of the configuration shown in FIG. 1 will be described for the configuration of the light guide 4 of the present embodiment. FIG. 15 shows a cross-sectional view and a front view of the light guide 4 serving as a seventh variant.

In the configuration shown in FIG. 1, the sectionalizing portion of the step in the extending direction of the light guide 4, that is, the line at the end face of the core 10 shown in the front view of FIG. 1 is formed in plurals in the Y direction. In the configuration of the seventh variant, on the other hand, only one sectionalizing portion of the step in the extending direction of the light guide 4, that is, the line at the end face of the core 10 (or the light guide 4) shown in the front view of FIG. 15 is formed. According to such configuration as well, the region of the light incident surface 4A and the region of the light exit surface 4B of the core can be enlarged compared to the conventional configuration, and thus the coupling loss can be reduced.

(Application Example)

The light guide 4 of the present embodiment can be applied to the following application examples.

First, as a first application example, use can be made at a hinge portion in a foldable electronic device such as a foldable portable telephone, a foldable PHS (Personal Handyphone System), a foldable PDA (Personal Digital Assistant), and a foldable notebook computer.

Figure 16:
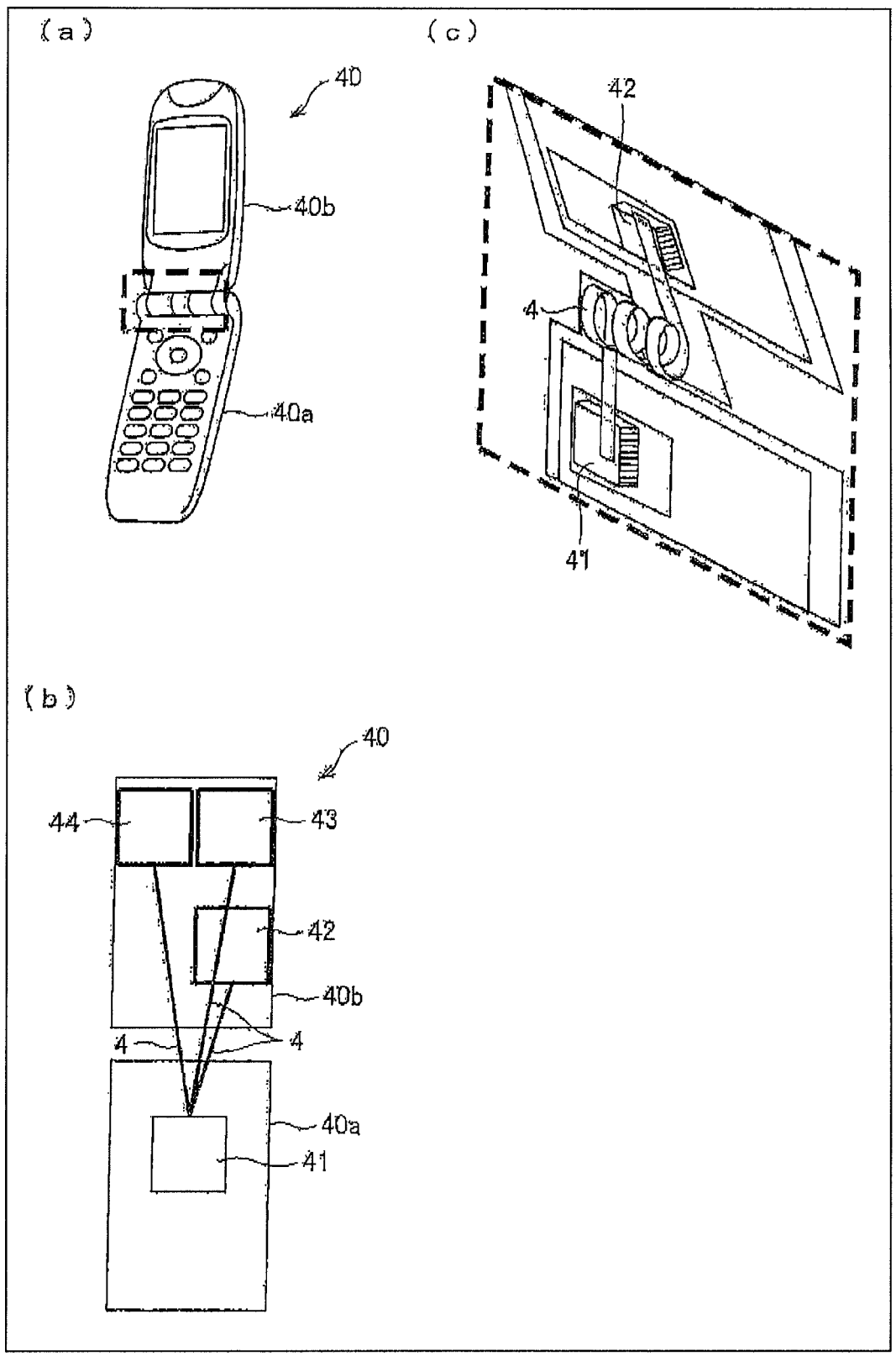
FIG. 16(a) is a perspective view showing an outer appearance of a foldable portable telephone including the light guide according to the present embodiment, (b) is a block diagram of a portion where the light guide is applied in the foldable portable telephone shown in (a), and (c) is a perspective plan view of a hinge portion in the foldable portable telephone shown in (a).

FIGS. 16(a) to 16(c) show an example in which the light guide 4 is applied to a foldable portable telephone 40. In other words, FIG. 16(a) is a perspective view showing an outer appearance of the foldable portable telephone 40 incorporating the light guide 4.

FIG. 16(b) is a block diagram of a portion where the light guide 4 is applied in the foldable portable telephone 40 shown in FIG. 16(a). As shown in the figure, a control unit 41 arranged on a body 40a side in the foldable portable telephone 40, an external memory 42, a camera (digital camera) 43, and a display unit (liquid crystal display) 44 arranged on a lid (drive portion) 40b side rotatably arranged at one end of the body with the hinge portion as a shaft are connected by the light guide 4.

FIG. 16(c) is a perspective plan view of the hinge portion (portion surrounded with a broken line) in FIG. 16(a). As shown in the figure, the light guide 4 is wrapped around a holding rod at the hinge portion and bent to thereby connect the control unit arranged on the body side, and the external memory 42, the camera 43, and the display unit 44 arranged on the lid side.

High speed and large capacity communication can be realized in a limited space by applying the light guide 4 to the foldable electronic device. Therefore, it is particularly suitable in devices where high speed and large capacity data communication is necessary and miniaturization is demanded such as the foldable liquid crystal display.

As a second application example, the light guide 4 is applied to a device having a drive portion such as a printer head in a printing device (electronic device) and a reading unit in a hard disk recording and reproducing device.

Figure 17:
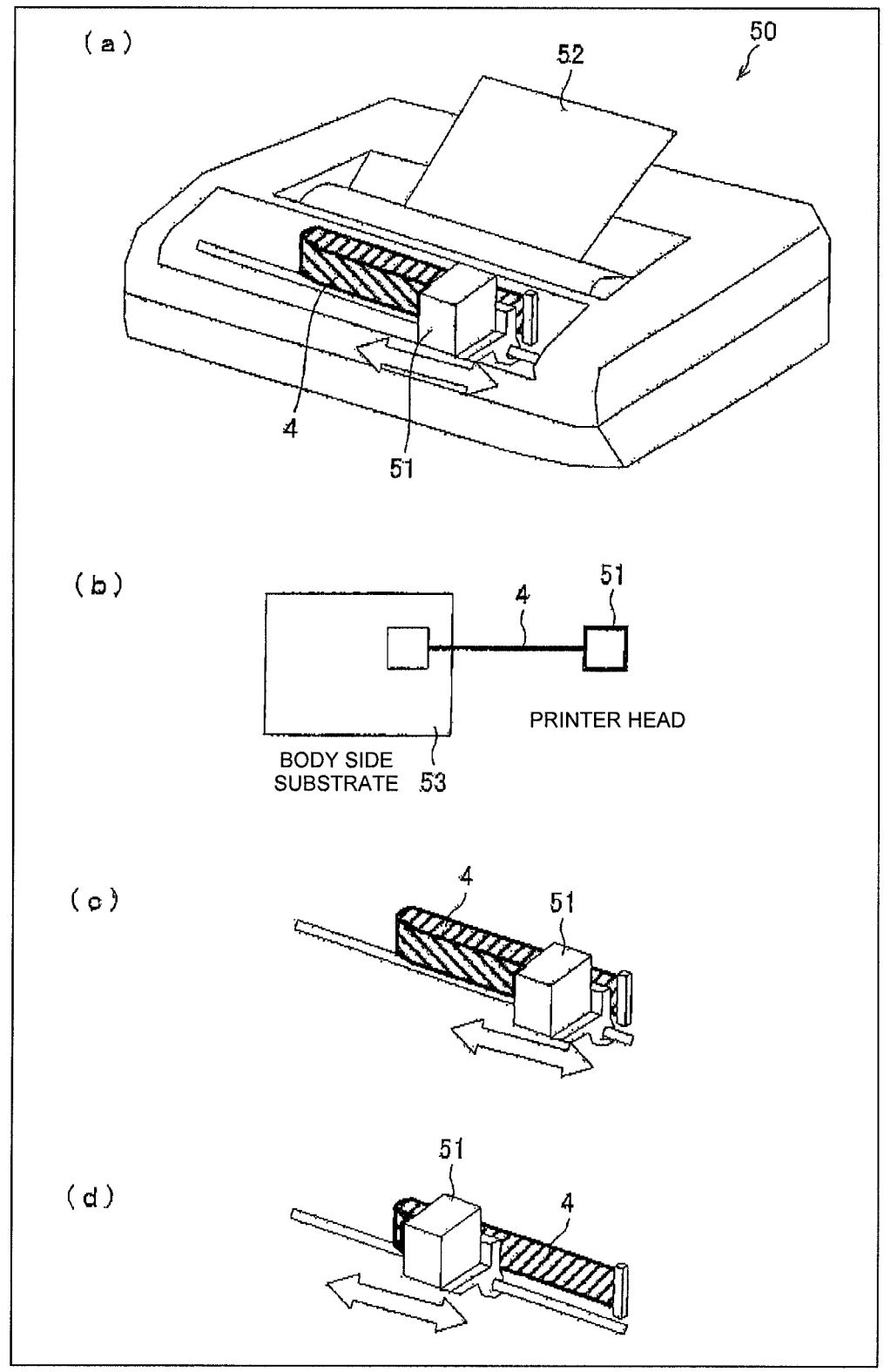
FIG. 17(a) is a perspective view showing an outer appearance of a printing device including the light guide according to the present embodiment, (b) is a block diagram showing the main parts of the printing device shown in 17(a), and (c) and (d) are perspective views showing a curved state of the light guide when the printer head is moved (driven) in the printing device.

FIGS. 17(a) to 17(c) show an example in which the light guide 4 is applied to a printing device 50. FIG. 17(a) is a perspective view showing an outer appearance of the printing device 50. As shown in FIG. 17(a), the printing device 50 includes a printer head 51 for performing printing on a paper 52 while moving in a width direction of a paper 52, where one end of the light guide 4 is connected to the printer head 51.

FIG. 17(b) is a block diagram of a portion where the light guide 4 is applied in the printing device 50. As shown in the figure, one end of the light guide 4 is connected to the printer head 51, and the other end is connected to a body side substrate in the printing device 50. The body side substrate includes control means etc. for controlling the operation of each unit of the printing device 50, and the like.

FIG. 17(c) and FIG. 17(d) are perspective views showing a curved state of the light guide 4 when the printer head 51 is moved (driven) in the printing device 50. As shown in the figures, when the light guide 4 is applied to the drive portion such as the printer head 51, the curved state of the light guide 4 changes by the drive of the printer head 51 and each position of the light guide 4 repeatedly curves.

Therefore, the light guide 4 according to the present embodiment is suited for such drive portion. High speed and large capacity communication using the drive portion can be realized by applying the light guide 4 to such drive portions.

Figure 18:
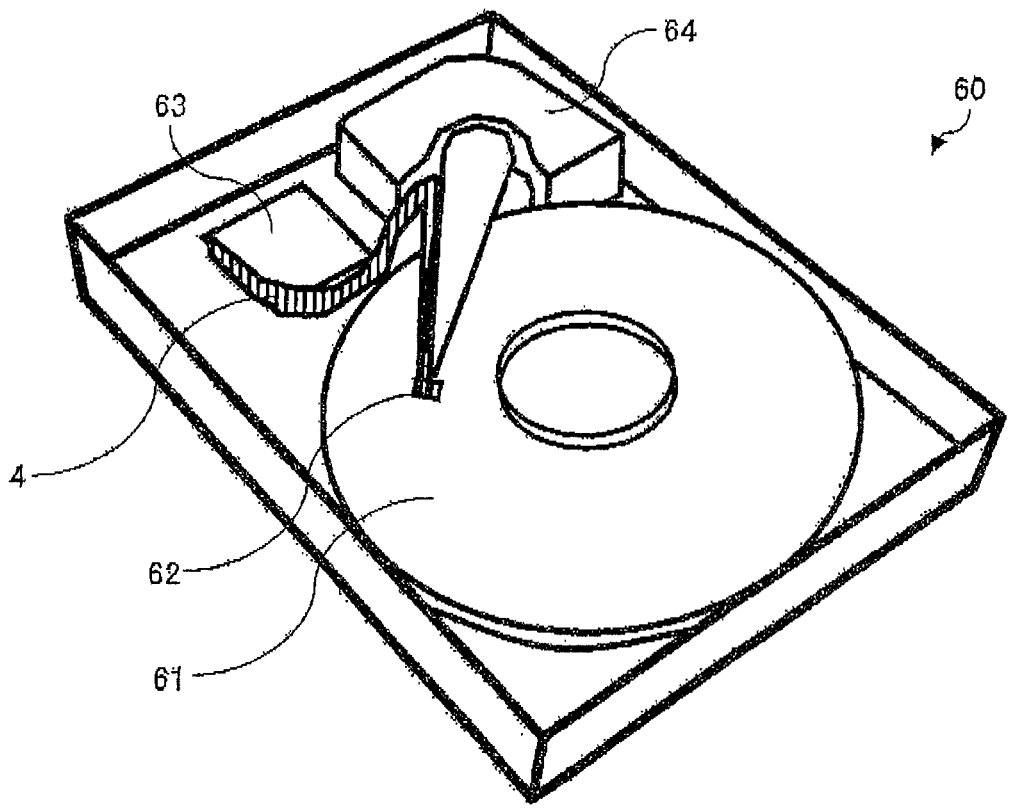
FIG. 18 is a perspective view showing an outer appearance of a hard disc recording and reproducing device including the light guide according to the present embodiment.

FIG. 18 shows an example in which the light guide 4 is applied to a hard disk recording and reproducing device 60.

As shown in the figure, the hard disk recording and reproducing device 60 includes a disk (hard disk) 61, a head (read/write head) 62, a substrate introducing portion 63, a drive portion (drive motor) 64, and the light guide 4.

The drive portion 64 drives the head 62 along a radial direction of the disk 61. The head 62 reads the information recorded on the disk 61 and writes information on the disk 61. The head 62 is connected to the substrate introducing portion 63 by way of the light guide 4, and propagates the information read from the disk 61 to the substrate introducing portion 63 as a light signal and receives the light signal of the information to write to the disk 61 propagated from the substrate introducing portion 63.

Therefore, high speed and large capacity communication can be realized by applying the light guide 4 to the drive portion such as the head 62 in the hard disk recording and reproducing device 60.

The present invention is not limited to the above-described embodiments, and various modifications may be made within the scope of the Claims. In other words, the embodiments obtained by combining the technical means appropriately modified within the scope of the Claims are encompassed in the technical scope of the present invention.

Therefore, the light guide according to the present invention has a configuration in which at least one of the light incident surface or the light exit surface of the core is formed in a stepwise manner in the extending direction to include a plurality of inclined surfaces.

Thus, the region of the light incident surface of the core can be enlarged at the light incident surface, whereby the fluctuation amount of the coupling loss due to variation in mounting the light emitting portion and the light guide can be suppressed. Furthermore, the irradiation region of the light exit from the light guide on the light receiving portion can be enlarged compared to the conventional configuration at the light exit surface. Therefore, a light guide capable of suppressing the fluctuation amount of the loss of light in light transmission and enabling stable light transmission with a simple configuration can be provided.

The light guide module according to the present invention has a configuration including the light guide, the light emitting portion for irradiating the light incident surface of the light guide with light, and the light receiving portion for receiving the light exit from the light exit surface of the light guide.

Thus, a light guide module capable of suppressing the fluctuation amount of the loss of light in light transmission and enabling stable light transmission with a simple configuration can be provided.

The specific embodiments or examples described in the DETAILED DESCRIPTION merely clarify the technical contents of the present invention, and should not be interpreted in a narrow sense limited to only such specific examples, and various modifications may be made within the spirit of the invention and the scope of the appended claims.

INDUSTRIAL APPLICABILITY

The light guide and the light guide module according to the present invention is applicable to the light communication path between various types of devices, and is also applicable to a flexible optical wiring serving as an in-device wiring mounted in a small and thin commercial-off-the-shelf device.

What is claimed is:

1. A light guide comprising:
a core made of a material having translucency; and
a clad made of a material having an index of refraction different from an index of refraction of the core and surrounding a periphery of the core,
wherein a light incident surface and a light exit surface, which are end faces of the core and the clad, are formed as inclined surfaces so that an orthogonal projection to a plane orthogonal to an extending direction of the light guide has a rectangular shape and being inclined at a predetermined angle in a direction of moving away from the end face;
wherein a light applied from a light source being introduced into the core by being reflected at the light incident surface and a light transmitted through the core being exit to outside by being reflected at the light exit surface;
wherein at least one of the light incident surface or the light exit surface of the core is arranged while shifted in parallel without changing respective inclined angles so that the inclined surface is divided into a plurality of inclined flat surfaces parallel in a longitudinal direction of the rectangular shape in the orthogonal projection and the plurality of inclined flat surfaces closer to the light source are positioned in a direction of moving away from the end face to be in a shape extending in the direction of moving away from the end face in a stepwise manner as a whole; and
wherein the plurality of inclined flat surfaces are discontinuously arranged with each other via other flat surfaces having a different inclined angle.

2. The light guide according to claim 1, wherein at least one of the light incident surface or the light exit surface of the core formed in a stepwise manner in the direction of moving away from the end face so as to include a plurality of inclined surfaces includes a reflection plate for reflecting the light applied from the light source.

3. A light guide module comprising:
the light guide according to claim 1;
a light emitting portion for irradiating a light incident surface of the light guide with light;
a light receiving portion for receiving light exit from a light exit surface of the light guide;

a light emission driving portion for driving light emission of the light emitting portion based on an externally input electrical signal; and an amplifier for amplifying the electrical signal output from the light receiving portion and outputting the amplified electric signal to outside.

4. The light guide module according to claim 3, wherein the light emitting portion irradiates the light guide with light from a lateral direction in an extending direction of the light guide; and the light guide introduces the light applied from the light emitting portion into the core by reflecting at the light incident surface.

5. The light guide module according to claim 3, wherein the light receiving portion receives light from the lateral direction in the extending direction of the light guide from the light guide; and the light guide exits the light transmitted through the light guide with respect to the light receiving portion by reflecting at the light exit surface.

6. An electronic device comprising the light guide module according to claim 3.

7. A light guide module comprising:

the light guide according to claim 2;

a light emitting portion for irradiating a light incident surface of the light guide with light;

a light receiving portion for receiving light exit from a light exit surface of the light guide;

a light emission driving portion for driving light emission of the light emitting portion based on an externally input electrical signal; and an amplifier for amplifying the electrical signal output from the light receiving portion and outputting the amplified electric signal to outside.

8. The light guide module according to claim 4, wherein the light receiving portion receives light from the lateral direction in the extending direction of the light guide from the light guide; and the light guide exits the light transmitted through the light guide with respect to the light receiving portion by reflecting at the light exit surface.

9. An electronic device comprising the light guide module according to claim 4.

10. An electronic device comprising the light guide module according to claim 5.

11. A light guide comprising:

a core made of a material having translucency;

a clad made of a material having an index of refraction different from an index of refraction of the core and surrounding a periphery of the core; and wherein a light incident surface and a light exit surface, which are end faces of the core and the clad, are formed as inclined surfaces so that an orthogonal projection to a plane orthogonal to an extending direction of the light guide has a rectangular shape and being inclined at a predetermined angle in a direction of moving away from the end face;

wherein a light applied from a light source is introduced into the core by being reflected at the light incident surface and a light transmitted through the core being exit to outside by being reflected at the light exit surface;

wherein at least one of the light incident surface or the light exit surface of the core is arranged while shifted in parallel without changing respective inclined angles so that the inclined surface is divided into a plurality of inclined surfaces parallel in a longitudinal direction of the rectangular shape in the orthogonal projection and the plurality of inclined surfaces closer to the light source are positioned in a direction of moving away from the end face to be in a shape extending in the direction of moving away from the end face in a stepwise manner as a whole; and wherein at least one of the light incident surface or the light exit surface of the core is formed so that a distance between adjacent lines differs from each other at a plurality of lines representing a sectionalizing portion of the inclined surface shown in a plane when projected to the plane orthogonal to the extending direction of the light guide.

12. The light guide according to claim 11, wherein at least one of the light incident surface or the light exit surface of the core formed in a stepwise manner in the direction of moving away from the end face so as to include a plurality of inclined surfaces includes a reflection plate for reflecting the light applied from the light source.

13. A light guide module comprising:

the light guide according to claim 11;

a light emitting portion for irradiating a light incident surface of the light guide with light;

a light receiving portion for receiving light exit from a light exit surface of the light guide;

a light emission driving portion for driving light emission of the light emitting portion based on an externally input electrical signal; and an amplifier for amplifying the electrical signal output from the light receiving portion and outputting the amplified electric signal to outside.

* * * * *